United States Patent
Taube et al.

(10) Patent No.: US 12,026,889 B2
(45) Date of Patent: Jul. 2, 2024

(54) CHARACTERIZATION PLATFORM FOR SCALABLE, SPATIALLY-RESOLVED MULTISPECTRAL ANALYSIS OF TISSUE

(71) Applicant: The Johns Hopkins University, Baltimore, MD (US)

(72) Inventors: Janis Marie Taube, Baltimore, MD (US); Sandor Szalay, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 18/356,544

(22) Filed: Jul. 21, 2023

(65) Prior Publication Data
US 2024/0029266 A1    Jan. 25, 2024

Related U.S. Application Data

(63) Continuation of application No. 17/278,112, filed as application No. PCT/US2019/051952 on Sep. 19, 2019, now Pat. No. 11,756,203.
(Continued)

(51) Int. Cl.
*G06K 9/00*     (2022.01)
*G02B 21/36*    (2006.01)
(Continued)

(52) U.S. Cl.
CPC .............. *G06T 7/11* (2017.01); *G02B 21/367* (2013.01); *G06F 18/24* (2023.01); *G06T 3/4038* (2013.01);
(Continued)

(58) Field of Classification Search
CPC ........... G01N 21/6458; G01N 21/6408; G01N 2021/653; G01N 2201/0696;
(Continued)

(56) References Cited

U.S. PATENT DOCUMENTS

| 5,687,251 A  | * | 11/1997 | Erler ................. G06T 7/0012 |
|              |   |         | 382/199 |
| 11,756,203 B2 |  | 9/2023  | Taube et al. |

(Continued)

FOREIGN PATENT DOCUMENTS

| WO | 2013028926 A2 | 2/2013 |
| WO | 2017036921 A1 | 3/2017 |

OTHER PUBLICATIONS

Buczkowski, M.; Szymkowski, P.; Saeed, K. Segmentation of Microscope Erythrocyte Images by CNN-Enhanced Algorithms. Sensors 2021 (Year: 2021).*

(Continued)

*Primary Examiner* — Alex Kok S Liew
(74) *Attorney, Agent, or Firm* — Harrity & Harrity, LLP

(57) ABSTRACT

A device may obtain field images of a tissue sample, apply, to the field images, spatial distortion and illumination-based corrections (including corrections for photobleaching of reagents) to derive processed field images, identify, in each processed field image, a primary area including data useful for cell or subcellular component characterization, identify, in the processed field images, areas that overlap with one another, and derive information regarding a spatial mapping of cell(s) and/or sub-cellular components of the tissue sample. Deriving the information may include performing segmentation based on the data included in the primary area of each processed field image, and obtaining flux measurements based on other data included in the overlapping areas. The device may cause the information to be loaded in a data structure to enable statistical analysis of the spatial mapping for identifying factors defining normal tissue structure, associated inflammatory or neoplastic diseases and prognoses thereof, and associated therapeutics.

20 Claims, 12 Drawing Sheets

Related U.S. Application Data

(60) Provisional application No. 62/734,737, filed on Sep. 21, 2018.

(51) Int. Cl.
*G06F 18/24* (2023.01)
*G06T 3/4038* (2024.01)
*G06T 5/80* (2024.01)
*G06T 5/92* (2024.01)
*G06T 7/00* (2017.01)
*G06T 7/11* (2017.01)

(52) U.S. Cl.
CPC ............... *G06T 5/80* (2024.01); *G06T 5/92* (2024.01); *G06T 7/0014* (2013.01); *G06T 2200/24* (2013.01); *G06T 2207/10056* (2013.01); *G06T 2207/20076* (2013.01); *G06T 2207/20092* (2013.01); *G06T 2207/30024* (2013.01); *G06V 2201/03* (2022.01)

(58) Field of Classification Search
CPC ......... G01N 2021/6421; G01N 21/658; G01N 2021/6463; G01N 21/554; G01N 21/636; G01N 21/64; G01N 21/6428; G01N 2201/105; G01N 2333/948; G01N 2500/04; G01N 1/2813; G01N 2001/282; G01N 2021/6419; G01N 2021/6441; G01N 21/6452; G01N 21/648; G01N 2201/10; G01N 27/44704; G01N 27/44791; G01N 33/48721; G01N 33/54366; G01N 33/54393; G06T 11/001; G06T 2207/10024; G06T 2200/28; G06T 3/60; G06T 2207/10012; G06T 2207/10056; G06T 2207/20008; G06T 2207/20182; G06T 2207/20192; G06T 2207/20212; G06T 2207/20221; G06T 2207/30004

See application file for complete search history.

(56) References Cited

U.S. PATENT DOCUMENTS

| | | | |
|---|---|---|---|
| 2004/0197017 A1* | 10/2004 | Olschewski | G06T 7/0012 382/128 |
| 2006/0210129 A1 | 9/2006 | Trendelenburg et al. | |
| 2008/0044084 A1* | 2/2008 | Lee | G06T 5/00 382/190 |
| 2010/0151474 A1 | 6/2010 | Afanasyev et al. | |
| 2010/0215227 A1 | 8/2010 | Grunkin et al. | |
| 2015/0030219 A1 | 1/2015 | Madabhushi et al. | |
| 2021/0090238 A1* | 3/2021 | Gallagher-Gruber | G01N 15/0625 |

OTHER PUBLICATIONS

Fang Chen, Jia Liu, Dongzhou Gou, Xinran Zhang, Liangyi Chen, Hongen Liao, An accurate and universal approach for short-exposure-time microscopy image enhancement, Science Direct, Computerized Medical Imaging and Graphics, vol. 83, 2020 (Year: 2020).*

International Search Report and Written Opinion for Application No. PCT/US2019/051952, dated Dec. 12, 2019, 7 pages.

Lore K.G et al., "LLNet: A Deep Autoencoder Approach to Natural Low-light Image Enhancement," Elsevier, Pattern Recognition, 2017, vol. 61, pp. 650-662.

* cited by examiner

Relative displacement vectors of overlapping field images represented by elastic springs (with marking on center field image serving as pivot or "pinning"), where optimization model permits springs to settle into equilibrium about the pivot

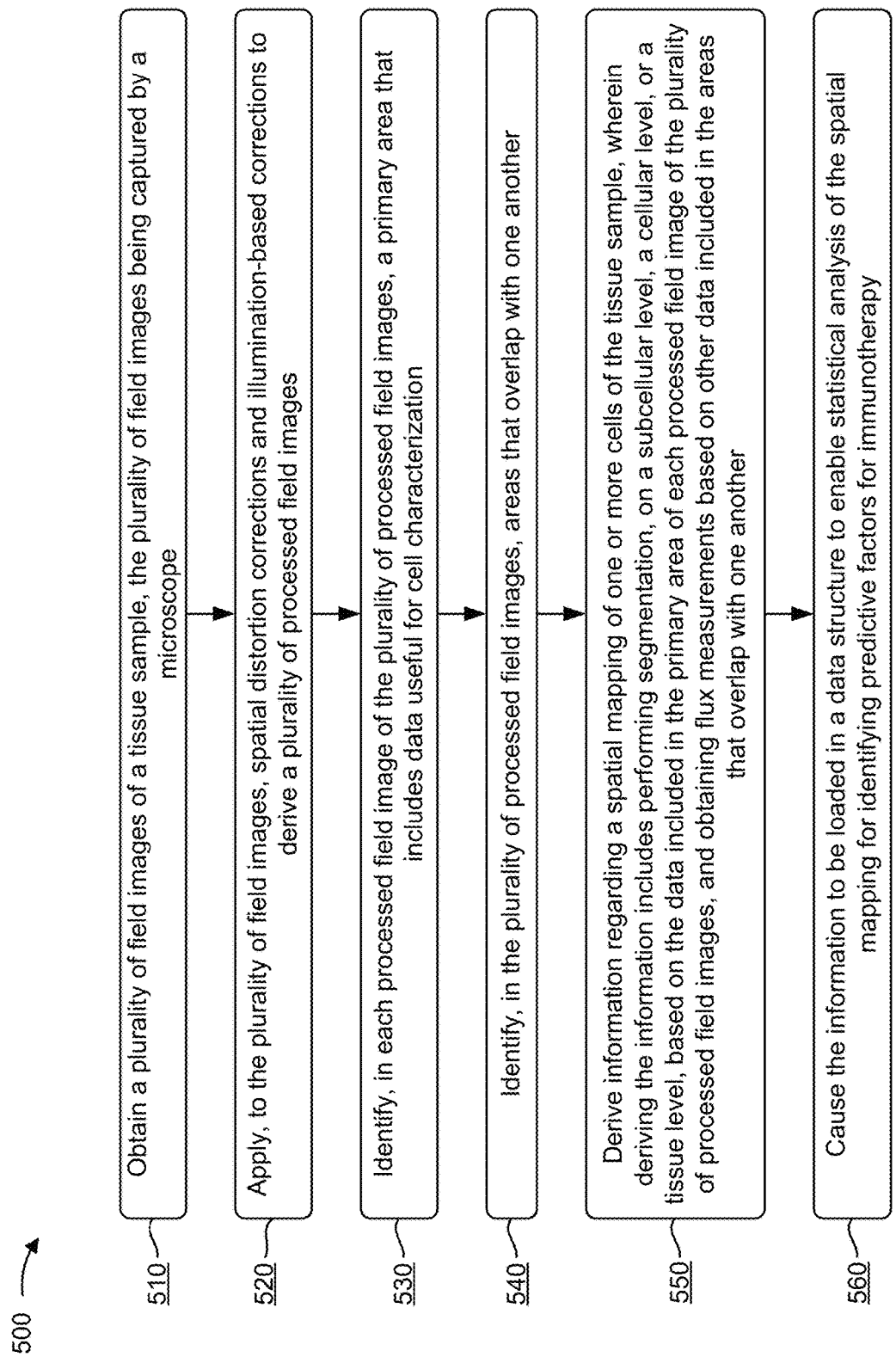

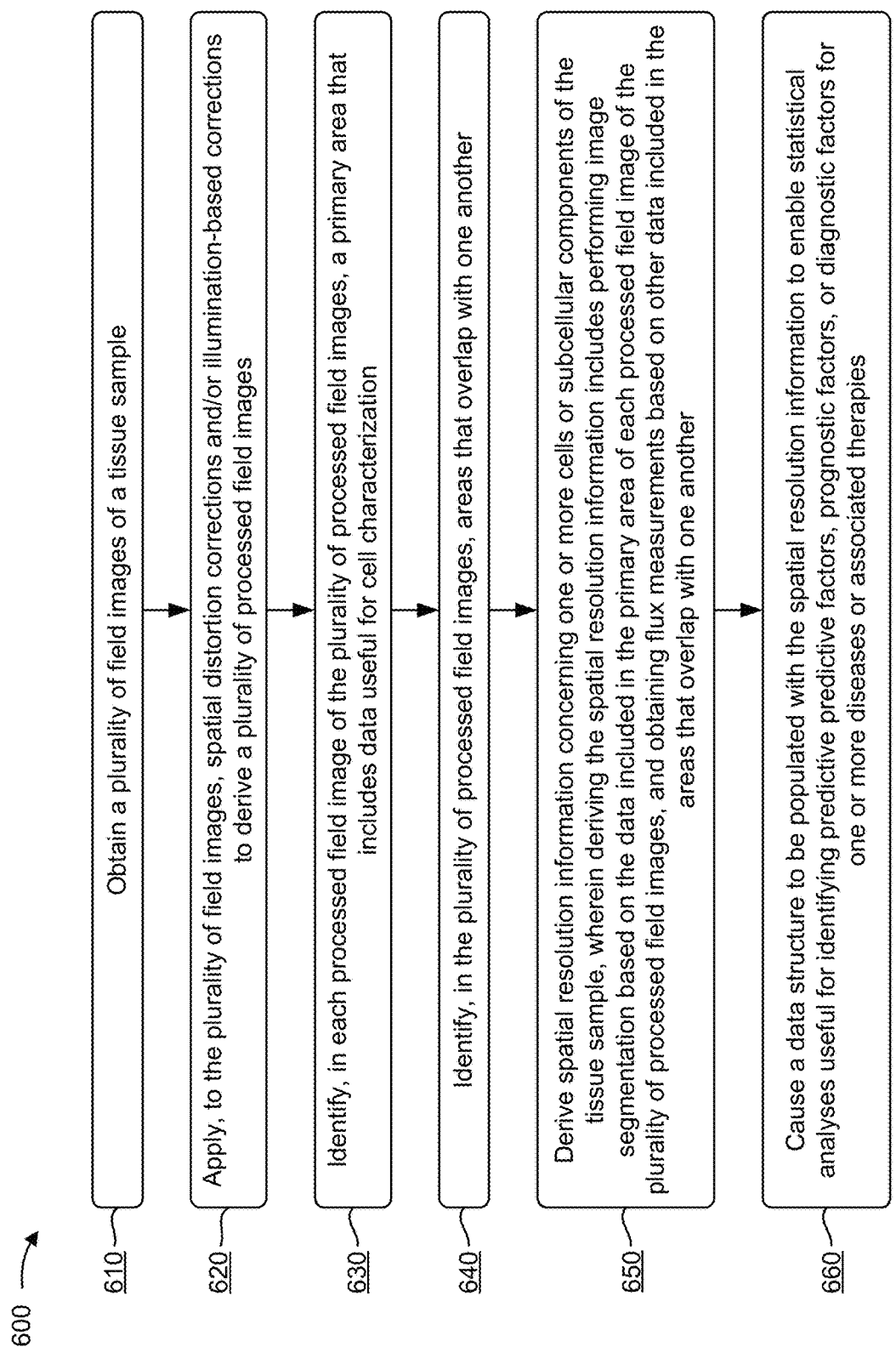

CHARACTERIZATION PLATFORM FOR SCALABLE, SPATIALLY-RESOLVED MULTISPECTRAL ANALYSIS OF TISSUE

RELATED APPLICATIONS

This application is a continuation of U.S. patent application Ser. No. 17/278,112, filed Mar. 19, 2021, which is a 371 national stage of PCT Application No. PCT/US2019/051952 filed on Sep. 19, 2019, entitled "CHARACTERIZATION PLATFORM FOR SCALABLE, SPATIALLY-RESOLVED MULTISPECTRAL ANALYSIS OF TISSUE," and which claims priority to U.S. Provisional Patent Application No. 62/734,737, filed on Sep. 21, 2018, the contents of which are incorporated herein by reference in their entireties.

GOVERNMENT LICENSE RIGHTS

This invention was made with government support under CA142779 awarded by the National Institutes of Health. The government has certain rights in the invention.

BACKGROUND

Based on recent successes with immunotherapy, such as programmed cell death-1 (PD-1)/programmed cell death ligand-1 (PD-L1) checkpoint blockade, the number of clinical trials with new immunotherapies and immunotherapy combinations is continuing to increase. Predictive biomarkers, that can accurately stratify the likelihood of patient benefit from a given immunotherapy and guide rational combinatorial strategies, are in high demand. The analysis of the tumor microenvironment in this context has illuminated the importance of quantitative spatial profiling of normal and abnormal cells, and expressed and secreted factors in healthy and abnormal tissues, in defining inflammatory and neoplastic disease and disease prognosis, as well as therapeutic decision-making and resultant outcomes.

SUMMARY

According to some possible implementations, a method may include obtaining, by a device, a plurality of field images of a specimen. The plurality of field images may be captured by a microscope. The method may include processing, by the device, the plurality of field images to derive a plurality of processed field images. The processing may include applying, to the plurality of field images, spatial distortion corrections and illumination-based corrections to address deficiencies in one or more field images of the plurality of field images. The method may include identifying, by the device and in each processed field image of the plurality of processed field images, a primary area that includes data useful for cell characterization or characterization of subcellular features, identifying, by the device, areas of overlap in the plurality of processed field images, and deriving, by the device, information regarding a spatial mapping of one or more cells of the specimen. Deriving the information may be based on performing, by the device, image segmentation based on the data included in the primary area of each processed field image of the plurality of processed field images, and obtaining, by the device, flux measurements based on other data included in the areas of overlap. The method may include causing, by the device and based on the information, an action to be performed relating to identifying features related to normal tissue, diagnosis or prognosis of disease, or factors used to select therapy.

According to some possible implementations, a device may include one or more memories, and one or more processors, communicatively coupled to the one or more memories, configured to obtain a plurality of field images of a tissue sample. The plurality of field images may be captured by a microscope. The one or more processors may be configured to apply, to the plurality of field images, spatial distortion corrections and illumination-based corrections to derive a plurality of processed field images, identify, in each processed field image of the plurality of processed field images, a primary area that includes data useful for cell characterization, identify, in the plurality of processed field images, areas that overlap with one another, and derive information regarding a spatial mapping of one or more cells of the tissue sample. The one or more processors, when deriving the information, may be configured to perform segmentation, on a subcellular level, a cellular level, or a tissue level, based on the data included in the primary area of each processed field image of the plurality of processed field images, and obtain flux measurements based on other data included in the areas that overlap with one another, and cause the information to be loaded in a data structure to enable statistical analysis of the spatial mapping for identifying predictive factors for immunotherapy.

According to some possible implementations, a non-transitory computer-readable medium may store instructions. The instructions may include one or more instructions that, when executed by one or more processors, cause the one or more processors to obtain a plurality of field images of a tissue sample, apply, to the plurality of field images, spatial distortion corrections and/or illumination-based corrections to derive a plurality of processed field images, identify, in each processed field image of the plurality of processed field images, a primary area that includes data useful for cell characterization, identify, in the plurality of processed field images, areas that overlap with one another, and derive spatial resolution information concerning one or more cells or subcellular components of the tissue sample. The one or more instructions, that cause the one or more processors to derive the spatial resolution information, cause the one or more processors to perform image segmentation based on the data included in the primary area of each processed field image of the plurality of processed field images, and obtain flux measurements based on other data included in the areas that overlap with one another. The one or more instructions, when executed by the one or more processors, may cause the one or more processors to cause a data structure to be populated with the spatial resolution information to enable statistical analyses useful for identifying predictive factors, prognostic factors, or diagnostic factors for one or more diseases or associated therapies.

BRIEF DESCRIPTION OF THE DRAWINGS

FIG. 5 is a flow chart of an example process for characterizing cells or subcellular components of a specimen for statistical analysis.

FIG. 6 is a flow chart of an example process for characterizing cells or subcellular components of a specimen for statistical analysis.

DETAILED DESCRIPTION

Figure 1A:
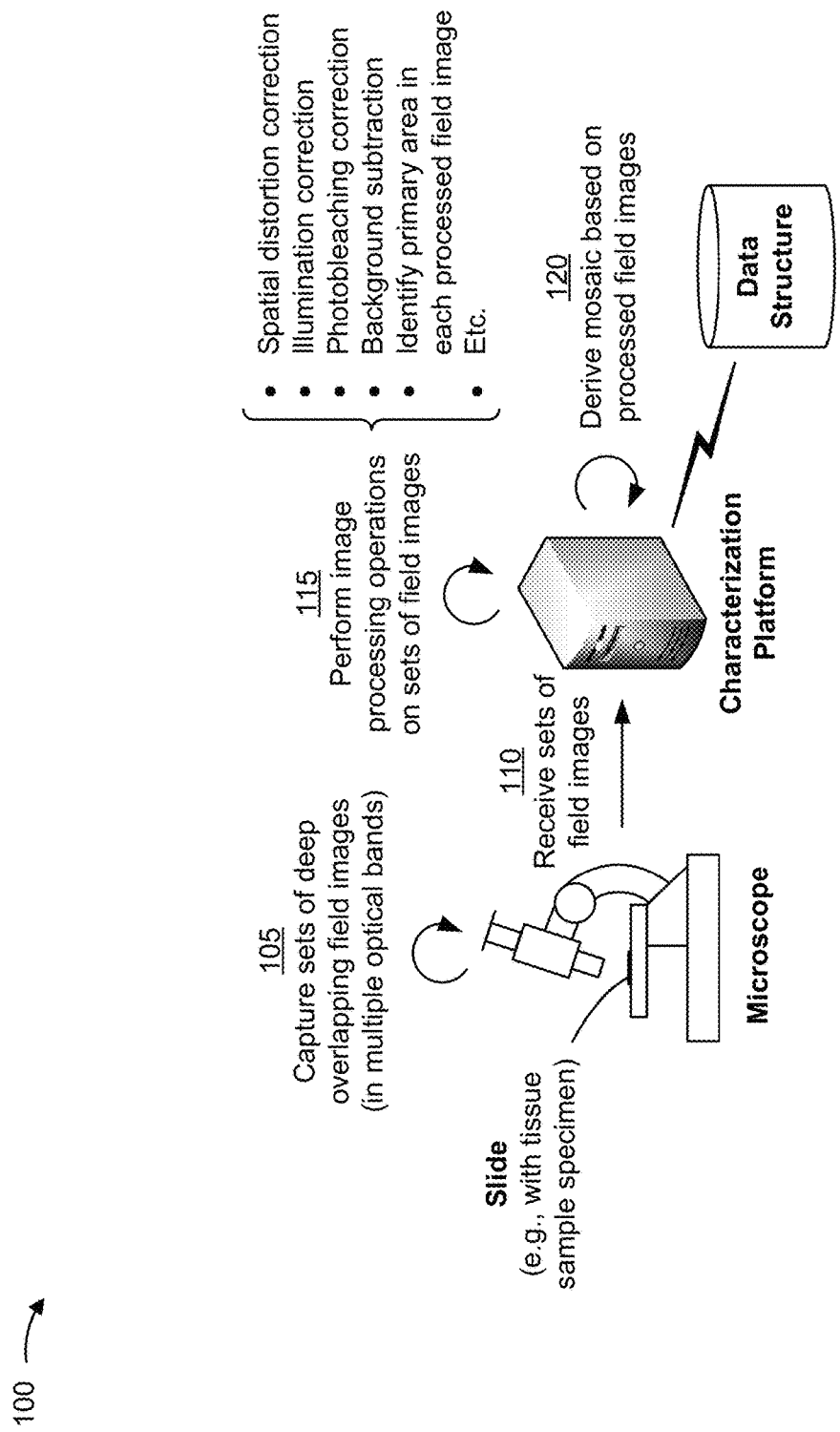
FIGS. 1A-1G are diagrams of an example implementation described herein.

The following detailed description of example implementations refers to the accompanying drawings. The same reference numbers in different drawings may identify the same or similar elements.

Prognostic assays, that predict response/resistance to a given immunotherapy, involve spatial resolution of complex immunophenotypes. Multiplex biomarker development may reliably pinpoint the geography of an expanded number of immunoactive factors in a tumor, or tumor immune, microenvironment. In-depth characterization of the microenvironment is typically achieved using formalin-fixed paraffin embedded (FFPE) tumor samples or specimens (e.g., similar to those routinely received in surgical pathology). Existing techniques extend single antibody immuno-labeling approaches, of routine FFPE tissue sections, to multilayered/multiplexed staining assays, using predominantly immunohistochemistry (IHC) and immunofluorescence (IF). However, these techniques typically analyze only a small number of high power fields or field images, which limits the dataset used to characterize a tumor immune microenvironment. Such techniques also involve a significant amount of manual human curation, which is time intensive, inefficient, error-prone, and unscalable, considering that large amounts of data (e.g., concerning tens of thousands of samples, tens of billions of cells, and/or the like, with aggregate data volumes in petabytes) may need to be processed and analyzed. In fact, such techniques rely on the use of spreadsheets for tracking information gleaned from field images, and while multi-antibody labeled tissue section scanning, using a microscope, may take a small amount of time (e.g., about fifteen minutes), it may take a trained pathologist many hours to create spreadsheet-based training sets that identify the spatial organization of key immunoactive/suppressive elements for use with subsequent cell segmentation and classification. Further, thresholds of positivity (e.g., for determining whether signal intensity, corresponding to a potential marker, is sufficient to identify a positive marker) may vary, from specimen to specimen, as a function of pre-analytic variables, and existing techniques rely on manual tuning of such thresholds (e.g., by a pathologist), which is also inefficient and error-prone.

Some implementations, described herein, provide a characterization platform (e.g., an end-to-end system) that is capable of providing fast, reliable, and highly-scalable characterizations of spatially-resolved interactions at or below the single-cell level. In some implementations, the characterization platform may be configured to execute an automated protocol or pipeline for analyzing multiplex immunofluorescent and/or immunohistochemistry data generated on tissue sections, including levels of expression of multiple markers. In some implementations, the automated pipeline may be implemented in various stages, including stages for obtaining high-quality field images of a specimen (e.g., by capturing, using a multispectral microscope, full sets of low-level multi-wavelength overlapping deep tissue field images), processing the field images (e.g., to register the field images, correct spatial distortions and illumination issues, and/or the like), deriving a mosaic using the field images, performing image segmentation and obtaining flux measurements (e.g., of cell markers, where appropriate color transformations may be associated with different tissue types, where available color information (e.g., all available color information) may be used to aid tissue/cell segmentation and classification, and where machine learning techniques may be utilized to cluster the color space into multiple regions that each corresponds to biologically meaningful morphological components for different tissue types), and developing an interactive data structure for storing raw and processed field image data, outputs of the image segmentation, and the flux measurements. In some implementations, the characterization platform may provide a user interface that enables a user (e.g., a scientific researcher and/or the like) to perform data analytics (e.g., using one or more functions, such as spatial operation functions, integrated with the data structure) on, and visualize, the stored data. Further, in some implementations, the characterization platform may be configured to automatically determine optimal thresholds of positivity for each individual specimen.

Providing an automated pipeline that is flexible and scalable, as described herein, permits the collection and processing of a larger amount of data (e.g., a greater quantity of field images, obtained in each of multiple optical bands) than possible with prior techniques, which increases analytical system throughput for aiding clinical trials and clinical sample collection. In addition, automatically determining optimal thresholds of positivity for each individual specimen, as described herein, also increases such throughput. Utilizing machine learning techniques also streamlines the identification of cell components, such as cellular nuclei, membranes, cytoplasms, and/or the like. Automating the loading of a data structure (e.g., a parallel data structure) with image segmentation outputs and flux measurements, and providing spatial operation functions for statistically analyzing the loaded data, reduces or eliminates a need to rely on unwieldy spreadsheets, increases the accuracy and reproducibility of a fully-automated cell classification system, and facilitates characterizations of interactions at the single-cell or sub-cellular level (e.g., including spatially-resolved measures of protein or Messenger Ribonucleic Acid (mRNA) expression). This provides faster and improved insight into normal immune tolerance, how cancer evades the immune system during development, immune-mediated side effects of new classes of cancer therapies, and/or candidate therapeutic targets.

FIGS. 1A-1G are diagrams of an example implementation 100 described herein. Example implementation 100 may include a microscope (e.g., a multispectral microscope with an image sensor or scanner) and a characterization platform. As shown in FIG. 1A, the characterization platform may include, or otherwise have access to, a data structure. For example, the data structure may be implemented as a database, a table, a trie, a linked list, an array, and/or the like.

In some implementations, a specimen (e.g., a slice of a tumor tissue and/or the like) may be prepared in a microscope slide, and positioned under the microscope for image capturing (e.g., for capturing of high power fields or field images) by the microscope. In some implementations, the microscope may be configured to capture multiple overlapping, deep field images, covering a portion, or an entirety, of the specimen, in a redundant manner. Overlapping areas of the field images may include duplicate data, such as multiple, repeat images of the same cells of the specimen. Such overlapping areas may be processed, for example, using various image processing operations (e.g., described in more detail below) to improve any imaging-related deficiencies that may be inherent in the microscope. This redundant data can also be used to characterize the accuracy of image segmentation and flux measurements.

In some implementations, the characterization platform may include one or more applications configured to execute a protocol or pipeline for image processing, image segmentation, obtaining flux measurements, and developing and/or populating a data structure, as described herein. In some implementations, the characterization platform may be configured to execute one or more stages of the pipeline automatically (e.g., the pipeline may be fully automated), based on user input, and/or the like.

As shown in FIG. 1A, and as shown by reference number 105, the microscope (e.g., based on programmed instructions provided by the characterization platform, based on user input, and/or the like) may capture multiple sets of field images of the specimen. For example, the microscope may capture a large quantity of field images, such as about 1,500 field images, about 2,000 field images, and/or the like. In some implementations, the microscope may capture field images across an entirety of the specimen. In some implementations, the microscope may capture field images that overlap (e.g., where a given object (e.g., a cell) may be imaged multiple times over multiple field images such that there are overlapping areas in the field images). In some implementations, the microscope may capture field images using multiple optical bands (e.g., light at different wavelengths or in different wavelength ranges). For example, light filters, corresponding to multiple wavelength ranges (e.g., thirty-five narrow wavelength ranges and/or the like) may be sequentially used to capture multiple sets of field images—e.g., capturing about 2,000 field images at each of thirty-five wavelength ranges may result in a total of about 2,000×35=70,000 field images.

As shown by reference number 110, the characterization platform may receive the sets of field images from the microscope. In some implementations, the characterization platform may be communicatively coupled to the microscope (e.g., to a processor and/or memory of the microscope) to control image capturing and/or to receive captured field images. As shown by reference number 115, the characterization platform may subject the sets of field images to various image processing operations. In some implementations, the image processing operations may include corrections of distortions in the field images of each set of field images. For example, overlapping areas in the field images may correspond to different sections of a field of view of the microscope's image sensor, and thus exhibit spatial distortions (e.g., warping due to artifacts of the microscope) that are different across the various field images. In some implementations, the characterization platform may be configured to iteratively develop a uniform correction model of spatial distortions for the field images in each set of field images, and apply corrections that align the field images (e.g., accurate to a fractional size of a pixel and/or the like) with one another to unwarp each field image. In some implementations, the characterization platform may cross-correlate overlapping areas of the field images to determine global placement of the field images, where, for example, warping and/or relative shifts between field images is minimal. In some implementations, cross-correlation may include determining mismatches between field images (e.g., relative shifts between field images), associating such mismatches with a virtual spring variable to identify how much a virtual spring is extended, and determining an appropriate position for each of the field images based on extensions of the virtual springs (e.g., based on identifying a center field image in a set of field images, and permitting cross-correlation to settle the field images, in the set of field images, into equilibrium).

For example, in some implementations, the characterization platform may be configured to determine optimal relative translations (e.g., shifts) in (x, y) positions of each pair of overlapping field images. In an array of field images, there may be 4-connected overlaps among the field images, 8-connected overlaps among the field images (e.g., in corners of the field images, which may contain fewer pixels, and may have a higher possibility of warping errors, than 4-connected overlaps), and/or the like. In some implementations, the characterization platform may determine updated centers of the field images, to minimize the relative shifts, using a model of elastic springs. For example, assume that each overlap in the field images corresponds to a spring that is stretched by an amount corresponding to the relative shifts between the field images, and that an array of field images is connected with a set of springs currently stretched by a different amount (or length). By pinning one of the field images to a center of the microscope slide, the remaining field images may be pulled into equilibrium as the springs settle. This equilibrium configuration may correspond to a minimum total spring energy, given the virtual spring connections and initial stretches thereof (e.g., as shown in FIG. 1F). Here, the energy of a single elastic spring may be defined as:

$$E(x) = \frac{1}{2}Dx^2 \qquad (1)$$

where D represents the spring constant and x, in this equation, represents the length of the spring. The entire system may be illustrated via a graph, where nodes (N) of the graph are the field images, and edges (E) are the overlaps of the field images. In some cases, only the 4-connected overlaps (and not the 8-connected overlaps) may be considered. Here, the initial energy of the entire system, in one of the dimensions (e.g., in the x dimension) may be defined as:

$$E = \frac{1}{2}D \sum_{(u,v) \in E} (s_{uv})^2 \qquad (2)$$

where $s_{uv}$ represents the empirically measured displacement between field images, or nodes, u and v, along the x direction. The summation may be over all edges between nodes u and v, where (u, v) forms an overlapping pair. After adjusting the nominal field center of node u by an amount (e.g., a small amount), x(u), the spring energy may be modified to:

$$E = \frac{1}{2}D \sum_{(u,v) \in E} (s_{uv} - x(u) + x(v))^2 \qquad (3)$$

To select an amount, x(u), that minimizes the total energy of the entire system, a partial derivative, with respect to each x(u), may be calculated and equated to equation (1) above. The value of D may also be assumed to be '1' to simplify the notation.

$$\frac{\partial E}{\partial x(w)} = \sum_{(u,v) \in E} (s_{uv} - x(u) + x(v)) \frac{\partial}{\partial x(w)} (s_{uv} - x(u) + x(v)) \qquad (4)$$

-continued $$\frac{\partial E}{\partial x(w)} = \sum_{(u,v) \in E} (s_{uv} - x(u) + x(v))[-\delta_{uw} + \delta_{vw}] \quad (5)$$

Subsequently, a sum of the Kronecker deltas may be calculated. As shown in the summation notation below, u:(uw)∈E may indicate that a sum is taken over all nodes u that overlap node w.

$$\frac{\partial E}{\partial x(w)} = \sum_{u:(u,w) \in E} (s_{uw} - x(u) + x(w)) \sum_{v:(w,v) \in E} (s_{wv} - x(w) + x(v)) \quad (6)$$

In a simpler form, this may be represented as follows (e.g., if a so-called adjacency matrix A is defined):

$$A_{uv} = \begin{cases} 1, & \text{if } (u, v) \in E \\ 0, & \text{else} \end{cases} \quad (7)$$

Further, a degree of a node, d(u), may be defined as a quantity of edges (e.g., overlaps) of node u. Here, the displacements $s_{uv}$ may be antisymmetric:

$$s_{uv} = -s_{vu} \quad (8)$$

The u and v sums over connected nodes may be the same:

$$\frac{\partial E}{\partial x(w)} = 2\left(d(w)x(w) - \sum_v A_{vw}x(v) + \sum_{u:(u,w) \in E} s_{uv}\right) \quad (9)$$

The Laplacian matrix L=D-A may then be introduced, where D, here, represents the diagonal matrix formed out of the degrees of each node. A vector S(w), which represents the sum along each row of $s_{wu}$, may also be defined:

$$S(w) = \sum_{u:(wu) \in E} s_{wu} \quad (10)$$

This may yield a simpler equation:

$$\frac{1}{2}\frac{\partial E}{\partial x(w)} = \sum_u L_{wu}x(u) - S(w) = 0 \quad (11)$$

The system of equations may have an infinite quantity of solutions, since all fields are floating, and thus an entire stable configuration may be translated by an arbitrary amount, without altering the energy. This may be resolved by pinning one of the fields, e.g., with a label z. Furthermore, the displacement of this field may be specified as x(z)=0. In this case, the z-th row and column of L, and the z-th element of S and x, may be removed to yield the matrix $\hat{L}$ and vectors $\hat{S}$ and $\hat{x}$. The set of linear equations may then include:

$$\hat{L}\hat{x} = \hat{S} \quad (12)$$

with a solution:

$$\hat{x} = \hat{L}^{-1}\hat{S} \quad (13)$$

The foregoing optimization may be performed in both dimensions (e.g., in the x dimension and the y dimension) as part of determining the optimal shifts for the field images.

In some cases, illumination, during image capturing by the image sensor of the microscope, may not be uniform across a field image. Thus, in some implementations, the image processing operations may include applying an illumination correction to overlapping areas of the field images—e.g., to calculate properly flat-fielded images where the field images have uniform, or substantially uniform, pixel intensities. In some implementations, photobleaching of reagents/tissue may occur due to acquisition of multiple overlapping field images. In such cases, the image processing operations may include corrections for such photobleaching. Alternatively, in some implementations, photobleaching effects may not be corrected, but may rather be leveraged to characterize and/or define cell types, subcellular component types, and/or the like.

In some implementations, the image processing operations may include a background subtraction process and/or the like. In some implementations, the characterization platform may, after subjecting the sets of field images to the above-described image processing operations, arrive at an overlapping mesh of field images.

In some implementations, the characterization platform may export, or save, each processed field image (e.g., registered, corrected for warping, flat-fielded, and/or the like) to a standard format (e.g., as a tagged image file format (TIFF) file, a portable network graphics (PNG) file, a bitmap (BMP) file, and/or the like) to enable subsequent image segmentation and obtaining of flux measurements (e.g., described in more detail below).

In some implementations, the characterization platform may identify a primary area, in each processed field image, that includes pixels of the highest quality (e.g., pixels that have been subjected to few, or none, of the above-described spatial distortion and/or illumination corrections). In some implementations, a set of pixels, positioned closest to a center point in a processed field image, may be considered as being part of a primary area of the processed field image. In some implementations, the characterization platform may define a boundary rectangle that includes and/or encloses the set of pixels to distinguish the primary area from a remainder of the processed field image (e.g., a remainder that may include an overlapping area of the processed field image). In various implementations, the primary areas of the processed field images may include the most pertinent data useful for statistical analysis and study. In some implementations, non-primary areas (e.g., the overlapping areas) of the processed field images may be utilized only for quality control (e.g., analyzed to compensate for errors in measurements provided by the microscope).

Returning to FIG. 1A, and as shown by reference number 120, the characterization platform may derive a mosaic based on the processed field images. For example, the characterization platform may derive the mosaic based on the primary areas identified in all the processed field images (e.g., by positioning the primary areas, edge-to-edge). An example mosaic is shown in FIG. 1D (color information not portrayed). As shown, the mosaic may be a large image (e.g., including about 60,000 pixels by about 40,000 pixels and/or the like) composed of seamless tiles or fields. A field may refer to a subset of or a portion of a larger image. For example, a field and/or boundaries of a field may be defined by a box, a polygon, a circle, an ellipse, a rectangle, a strip, and/or another shape. Providing a large mosaic, that includes the primary areas (e.g., the highest quality pixels) of all the processed field images, and thus the most statistically uniform, data for a portion, or an entirety, of a specimen, enables further analysis and derivation of additional data as needed (e.g., such as that which may be useful for display as visual overlays, as described in more detail below).

Figure 1B:
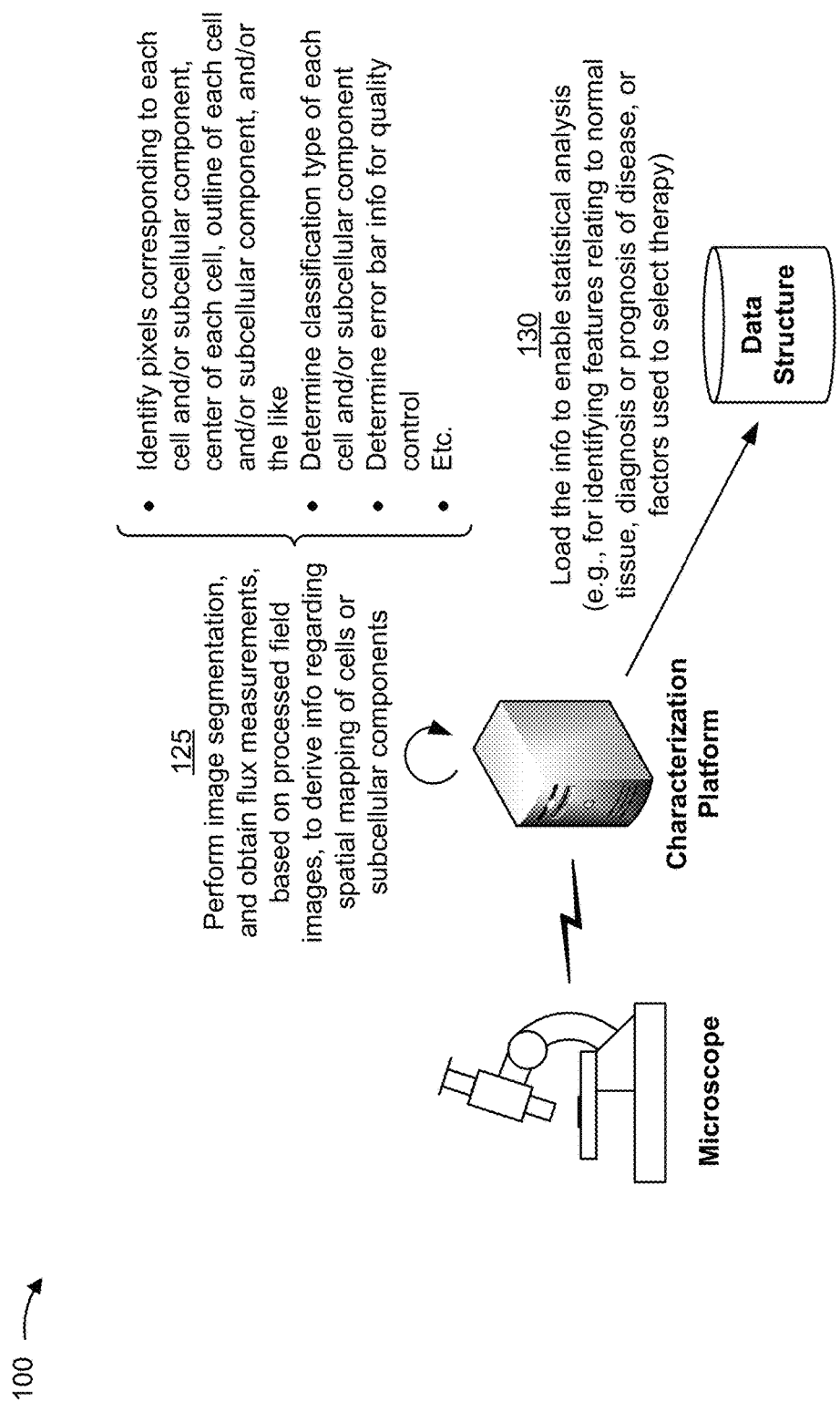

As shown in FIG. 1B, and as shown by reference number 125, the characterization platform may perform image segmentation and obtain flux measurements (e.g., of markers, such as cell markers) based on the processed field images. In some implementations, the characterization platform may perform image segmentation to identify pixels, in the primary areas of the processed field images, that correspond to cells (e.g., some or all of the cells) and/or subcellular components (e.g., some or all of the subcellular components) of the specimen. In some implementations, the characterization platform may, as part of image segmentation, utilize one or more image analysis and/or deep learning techniques (e.g., deep convolutional neural networks) to analyze the multispectral data in the processed field images. In some implementations, a 10-12 dimensional principal component analysis (PCA) color space may be defined and utilized in the image segmentation.

In some implementations, the characterization platform may identify the pixels that correspond to each cell and/or subcellular component, identify a center of each cell, determine an outline of each cell and/or subcellular component, classify each cell and/or subcellular component by type (e.g., as a tumor cell, as an immune cell, and/or the like that may be relevant for one or more immunotherapy reactions), determine an outline of a tumor, determine various spatially objective quantities (e.g., distances between cells, distances between subcellular components, and/or the like), and/or the like. In some implementations, the characterization platform may associate a classification probability with each cell and/or subcellular component, which enables identification, filtering, and/or improved cell and/or subcellular classification via Bayesian techniques and/or the like.

In some implementations, the characterization platform may combine cellular positions with protein or mRNA expression levels and/or the like of the markers, and map such cellular positions to sub-cellular compartments (e.g., nuclear, cytoplasmic, and membranous expression(s)). In some implementations, the characterization platform may determine cell phenotypic data for an immune cell subset, determine spatial position information of a given cell relative to a tumor and other immune cell subsets, and compute spatial relations between immune cells and tumor cells (e.g., conditioned on expression levels of several different markers, and on positions of such markers relative to tissue boundaries). This permits, for example, correlation of tissue architectural features with clinical parameters, such as age, survival, therapies received, and/or the like, as well as with other profiling features, such as genomics, transcriptomics, metabolomics, patient microbiome, and/or the like.

In some implementations, the characterization platform may obtain flux measurements, for various markers, based on overlapping areas of the processed field images. Overlapping field images may provide duplicate information (e.g., at least two times the information, and in some cases, four times the information) for a given cell or subcellular component—e.g., multiple cell-related measurements that may be different-which yields error bar information that may be useful for quantifying the accuracy of the image capturing process and the above-described image segmentation. In a sample case, the variance of measured flux differences, between overlapping areas of processed field images, is improved over variances obtained using existing techniques (e.g., improved by a factor of about 3.0 for PD-1 and by a factor of about 4.0 for PD-L1). In some implementations, uncertainty estimates may be quantified over narrowly defined samples (e.g., conditioned on cell type, subcellular component type, and/or the like).

In this way, the characterization platform may analyze the processed field images and perform associated measurements, in a highly-scalable and automated manner, to arrive at a spatial mapping of cellular subsets, secreted or transcription factors, mRNA expression, deoxyribonucleic acid (DNA) alterations (e.g., including, but not limited to, chromosomal alterations (e.g., translocations, amplifications, and/or deletions) observable via fluorescent in situ hybridization and/or similar techniques) in normal tissues and/or associated inflammatory conditions or tumors. This may involve processing tens of thousands of field images, and characterizing billions of cells and/or subcellular components, in a manner that cannot be performed manually or objectively by a human actor.

As shown by reference number 130, the characterization platform may store, or load, information, regarding outputs of the image segmentation and/or the flux measurements, in the data structure. In some implementations, the data structure may be configured to store a large amount of data (e.g., petabytes of data and/or the like).

In some implementations, the characterization platform may store information regarding a position of each cell and/or subcellular component, information regarding spatial coordinates of each cell and/or each subcellular component, information regarding an outline of each cell and/or each subcellular component (e.g., morphological data represented as a polygon and/or the like), information regarding a center of each cell, information regarding distances between cells (e.g., an immune cell and one or more nearby tumor cells), information regarding distances between subcellular components, information regarding distances between cells and a boundary of a tissue sample, information regarding distances between subcellular components and the boundary of the tissue sample, information regarding variable, dynamically-adjusted boundaries and/or contours within a specimen that may or may not represent any anatomic boundaries), information regarding flux measurements of various cell markers, information regarding multi-channel intensity measurements, and/or the like. This enables spatial operations to be performed on any of such information for a variety of statistical analyses (e.g., to determine if T-cells have penetrated into a tumor and/or the like).

In some implementations, the characterization platform may define a consistent global coordinate system (e.g., in microns) across the microscope slide, and transform a two-dimensional (2D) spatial position of each cell to the global coordinate system. Such a global coordinate system may also allow for 3D arrangements of multiple slide images and alignment of such images in a z-plane.

In some implementations, loading of the information into the data structure may be performed in two phases (e.g., including hierarchical error handling and reporting). For example, in some implementations, the characterization platform may perform validation and/or cleaning of the information prior to storing the information in the data structure. Continuing with the example, the characterization platform may initially store the information in a temporary data structure, process the information (e.g., by scrubbing the information to identify errors, verify consistency, and/or the like), and load the processed information into the data structure. This may avoid contamination of any existing data in the data structure with erroneous, or non-optimal, data.

In some implementations, the characterization platform may store, in the data structure, the originally-captured field images, the processed field images (e.g., registered, corrected, and/or the like, as described above), an image pyramid of the originally-captured field images and processed field images, information regarding an experimental field layout, and/or the like, which may allow for visual integration (of markers, e.g., at multiple resolutions) with other data in the data structure. In some implementations, the characterization platform may store information regarding a historical origin (e.g., a provenance) of each cell to a file or file structure corresponding to the cell. In some implementations, the characterization platform may store the above-described mosaic in the data structure. Additionally, or alternatively, the characterization platform may analyze the mosaic to determine spatial feature data (e.g., locations of cells and/or subcellular components, properties of cells and/or subcellular components, and/or the like), and store such spatial feature data in the data structure. In some implementations, the characterization platform may overlay some or all of such spatial feature data over the field images when the field images are displayed.

In some implementations, the characterization platform may store user-generated markups and/or annotations (e.g., generated during, or after, image segmentation and/or obtaining flux measurements, for example, to exclude fields of inferior image quality or highlight fields of specific interest). In some implementations, the characterization platform may store metadata that supports searching and/or spatial operations on the data in the data structure. For example, the metadata may describe contents of the data in the data structure, units of measurements that are used, and/or the like. In some implementations, the data structure may include (e.g., at multiple levels of granularity) internal tables containing a text-based description of each column, one or more objects (e.g., database objects), and/or the like. In some implementations, the characterization platform may automatically generate certain metadata by parsing a schema of the data structure (e.g., a database schema).

In some implementations, the characterization platform may store a flag, for each measurement relating to a cell and/or subcellular component, indicating whether the cell and/or subcellular component is included in a primary area of a processed field image or in an overlapping area thereof. This permits the characterization platform to distinguish between data that may be analyzed or spatially operated upon (e.g., data associated with primary areas of processed field images, which have the highest quality pixel information useful for statistical analyses) and data that may be used mainly for error estimations and quality control (e.g., data associated with overlapping areas of the processed field images).

In some implementations, the data structure may include a set of indexes for optimal search functionality and performance. For example, the indexes may represent spatial positions, spatial relations, and/or the like.

In various implementations, and as briefly described above, the data structure may support functions that enable a user (e.g., a scientific researcher and/or the like) to perform various analytics on the data stored in the data structure. In some implementations, the functions may include user-defined functions relating to analytics patterns (e.g., low-level or mid-level analytics). For example, the functions may relate to spatial searches, operations on spatial polygons (e.g., operations associated with identifying unions, identifying intersections, identifying differences, shrinking polygons, growing polygons, and/or the like), custom aggregations subject to various conditions (e.g., cell phenotypes, subcellular phenotypes, expression levels, spatial relations, and/or the like) optimized for analytics and research, and/or the like. In some implementations, the functions may be capable of representing (e.g., operating on or causing to be visually presented) spatial polygons relating to tissue boundaries, morphological features of cells, shapes of morphological components of cells (e.g., the nucleus, the membrane, and/or the cytoplasm). In some implementations, the functions may enable calculations of spatial distances between cells, spatial distances between subcellular components, spatial distances between cells and tissue boundaries, spatial distances between subcellular components and tissue boundaries, and/or the like. In some implementations, the functions may be capable of representing (e.g., operating on or causing to be visually presented) markers associated with cell components and/or the like.

Figure 1C:
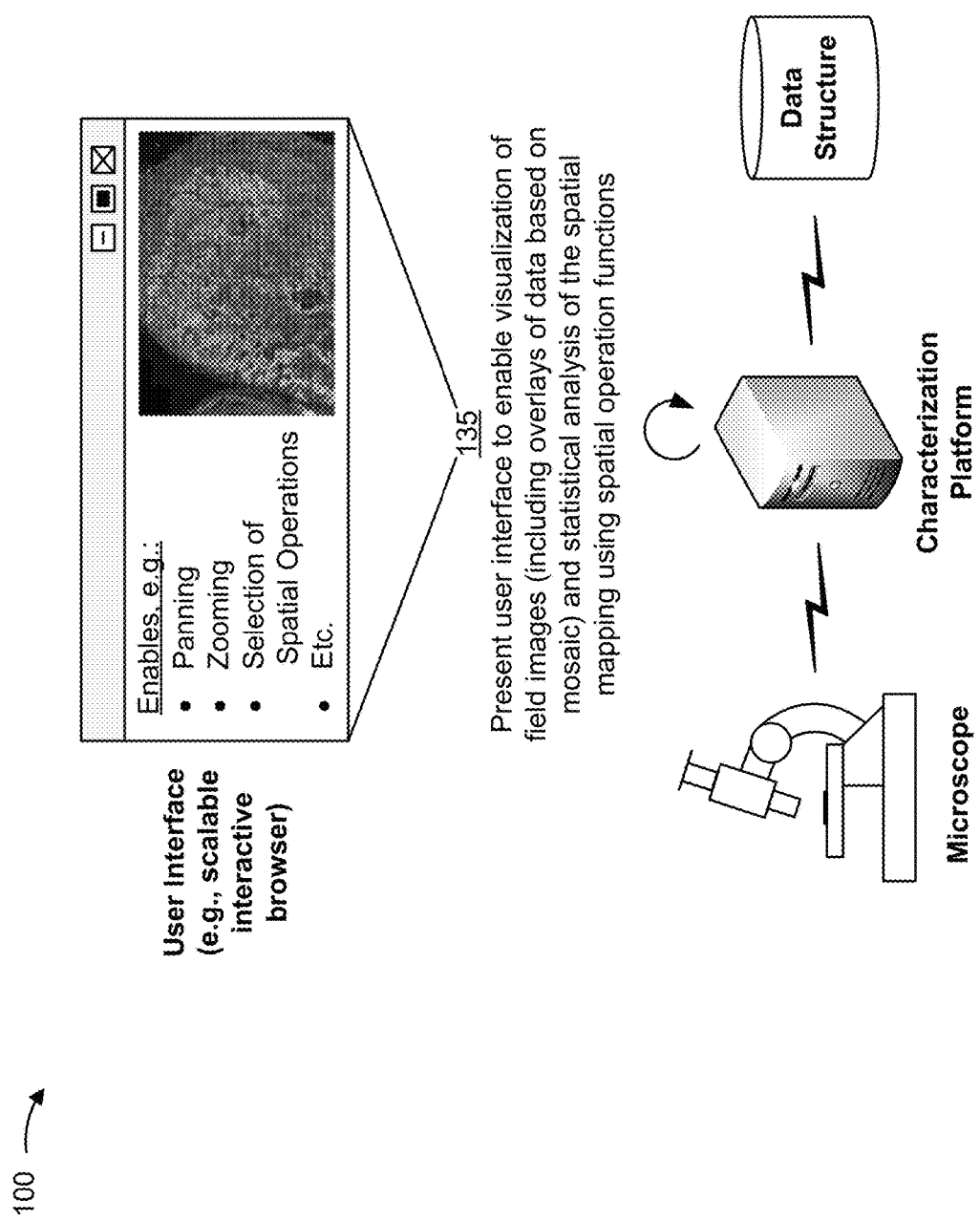
Figure 1D:
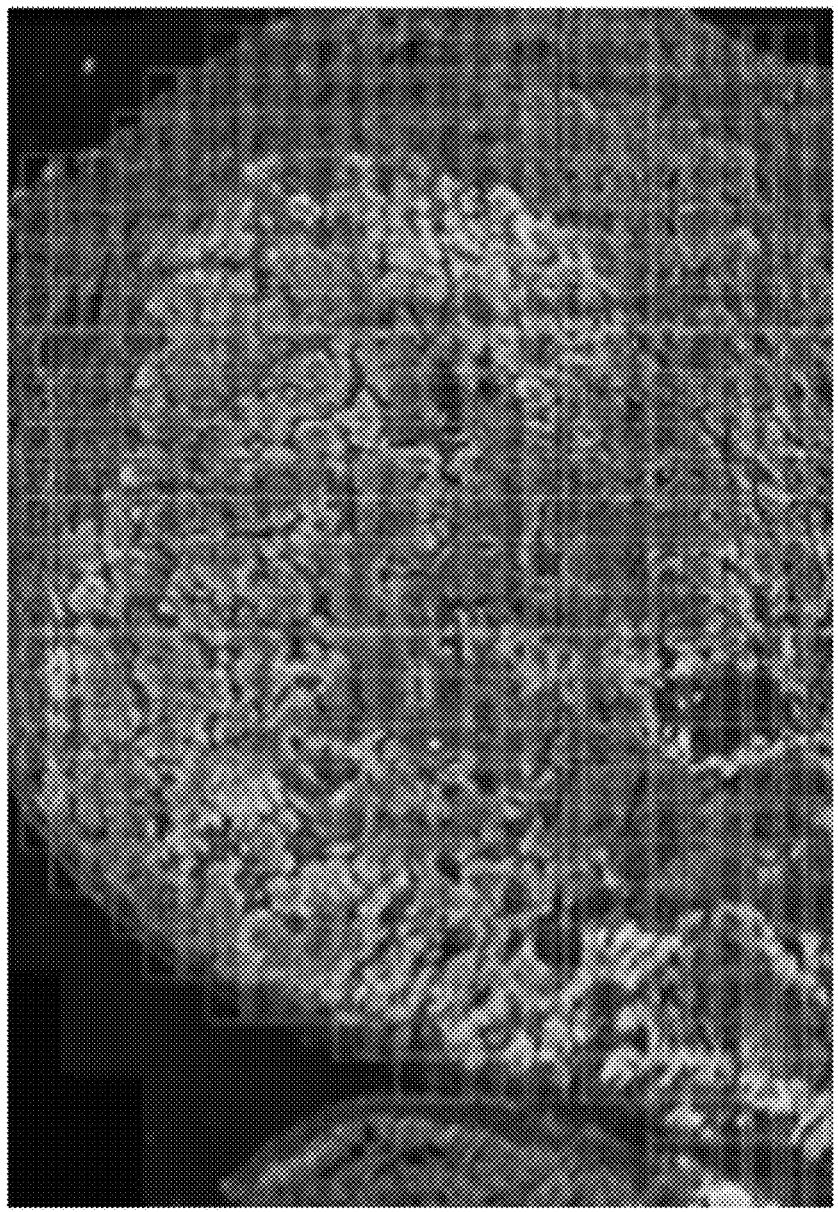

As shown in FIG. 1C, and as shown by reference number 135, the characterization platform may provide a user interface configured to permit a user to navigate, and execute searches and/or analytics on, the data stored in the data structure. In some implementations, the user interface may be implemented as a scalable interactive browser that permits manipulation (e.g., zooming in (e.g., down to the highest resolution) and out, panning, and/or the like) of field images and/or whole-tissue images (e.g., a mosaic) stored in the data structure. In some implementations, the user interface may be configured to present various types of data stored in the data structure (e.g., relating to morphological components of cells, spatial features, and/or the like, which may be learned from the image segmentation, the flux measurements, and/or the mosaic) as an overlay.

In some implementations, the data structure may support queries (e.g., low-level database queries), and may be integrated with statistical packages (e.g., high-level packages, such as R, MATLAB, Python, and/or the like) that include distribution functions and/or functions configured to characterize intercellular distances relating to various subsets. This enables data analytics (e.g., directly in the data structure environment) without needing to copy data from the data structure to an external computing device for analysis.

In some implementations, the characterization platform may be configured to operate on the data in the data structure to mark individual cells, subcellular components, or regions of interest that satisfy certain criteria. In some implementations, the user interface may be configured to present such marked regions, which may facilitate spatial harvesting for single-cell transcriptomic or genomic studies. In some implementations, the user interface may provide a user-selectable option to export lists of marked regions for further review or study.

In addition to enabling the characterization of cells and/or subcellular components, the characterization platform may also enable characterizations of tumor and immune interactions, such as relating to PD-1, PD-L1, and/or the like. In some implementations, various flux measurements may be used to determine whether activation of markers for such interactions is positive or negative. In some implementations, the characterization platform may utilize individual image layers for detecting each such marker (e.g., to identify cells that may have an overlay in a color corresponding a marker, and determine whether an intensity of the overlay satisfies a threshold of positivity). For example, an intensity that does not satisfy the threshold of positivity may be indicative of noise. In some implementations, the characterization platform may include an algorithm configured to determine an optimal threshold of positivity for each marker of each specimen of interest. This permits the characterization platform to accurately, and automatically, identify markers, which may facilitate studies of cellular interactions and associated factors (e.g., studies via deep learning and/or the like). For example, in some implementations, the characterization platform may be configured to utilize the identified information to automatically generate (e.g., using one or more deep learning algorithms and/or the like) recommendations for one or more particular diagnoses or therapeutics and/or the like.

Figure 1E:
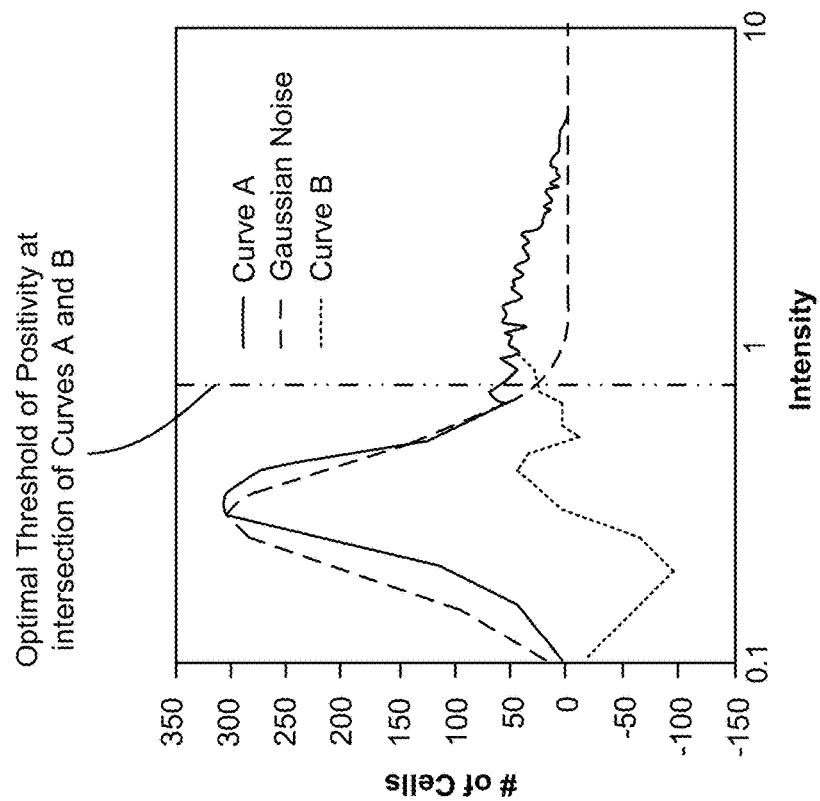
Figure 1F:
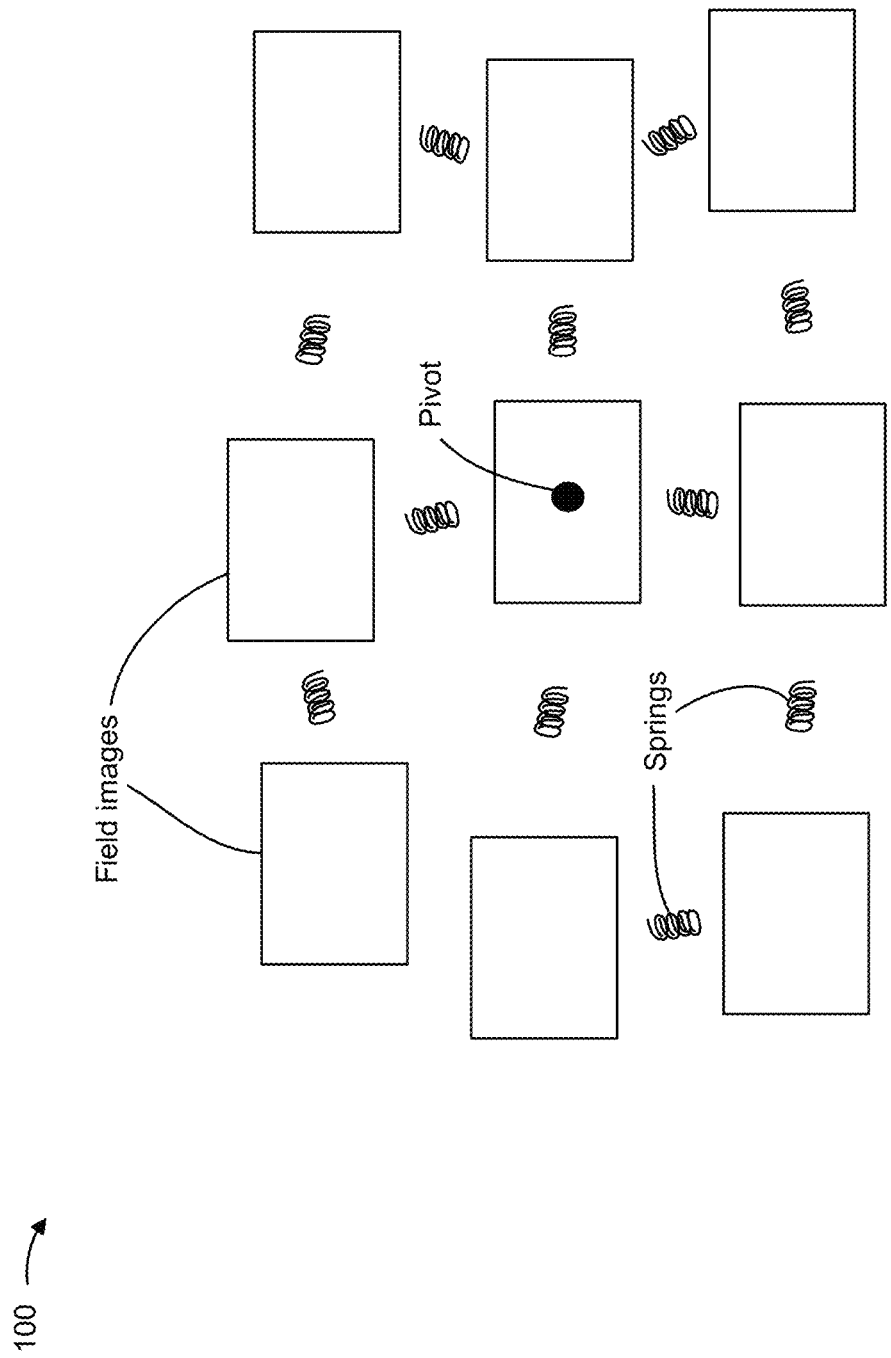

In some implementations, the algorithm may determine differences between positive and negative results (e.g., corresponding to marker signal and noise, respectively), and identify an intersection of the results to determine an optimal threshold of positivity. FIG. 1E is a diagram that illustrates a mathematical model for determining an optimal threshold of positivity for a particular specimen of interest. As shown in FIG. 1E, curve A is a distribution of all the intensities of the cells of a specimen. Assuming that noise is approximately Gaussian, the algorithm may be configured to subtract such noise from curve A to arrive at curve B, and determine an optimal threshold of positivity based on an intersection of curve A and curve B. Applying such an optimal threshold of positivity enables proper cell identification and quantification (e.g., counting). Additionally, or alternatively, an algorithm may be configured to determine an optimal threshold of positivity by setting a first threshold of positivity for a first field image, setting a second threshold of positivity for a second field image, performing a comparison of overlapping area(s) of the two field images, utilizing a result of the comparison to adjust the first threshold of positivity and/or the second threshold of positivity, and repeating the comparison until a predefined result is achieved (e.g., where the same marker identification results are obtained for both field images). In any case, in some implementations, the characterization platform may provide a user-selectable option to adjust a value of the threshold of positivity, as needed.

In some implementations, the characterization platform may analyze fields (or tiles) of a derived mosaic of a tissue image to identify fields in which a feature (e.g., a marker, a biomarker, an anatomic characteristic such as a vessel, and/or the like) is present. Additionally, or alternatively, the characterization platform may determine a level of this feature in each field of a set of analyzed fields. The level of the feature may represent, for example, a density of the marker within the field, a level of expression of the marker within the field, and/or the like. The characterization platform may sort and/or rank the fields according to the level of expression, and may select a threshold number of fields (e.g., 20 fields, 25 fields, 30 fields, either based on marker expression or a random sampling) or a threshold percentage of fields (e.g., of all analyzed fields, of all fields exhibiting the marker, of all fields in the mosaic) with a desired level of expression (e.g., the highest marker densities). The characterization platform may further analyze the selected fields to predict responsiveness of the tissue to one or more types of immunotherapies. For example, the characterization platform may analyze the selected fields for another feature, and the level of this other feature may indicate a predicted level of responsiveness to immunotherapy.

Figure 1G:
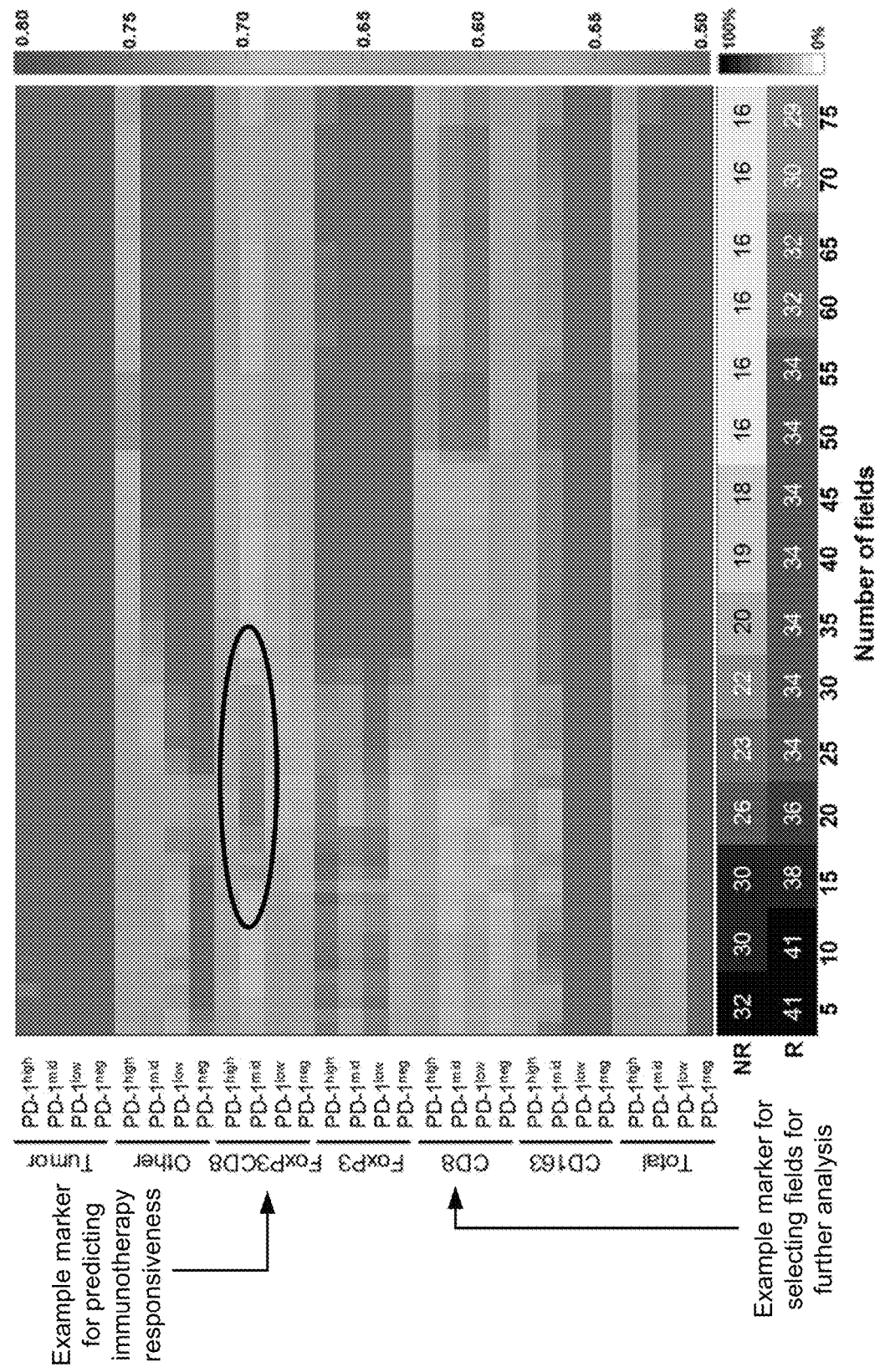

In some implementations, the characterization platform may use a first feature to select the fields, and may use a second feature to analyze the selected fields to predict responsiveness to immunotherapy. As an example, and as shown in FIG. 1G, the first feature may be a CD8 marker, and the second feature may be combined FoxP3CD8 or CD163 PD-Lineg, FoxP3CD8 PDL1+mid, Other cells PD1low+, PDL1+, FoxP3CD8+PD1+mid, CD 163 PDL1+, and/or the like. Although two features are provided as an example, a larger number of features may be used in some implementations. Additionally, or alternatively, other features may be used as the first feature and/or the second feature, such as an anatomic characteristic (e.g., a vessel), a location within the tumor microenvironment (e.g., a peritumoral region), a staining characteristic of a marker, a cell expression of a marker, and/or the like. Furthermore, while a level of a feature is described above as the technique for selecting fields and analyzing those fields for immunotherapy responsiveness, other techniques may be used, such as a level of expression of a marker, co-expression of multiple markers, spatial proximity of the same marker, spatial proximity of different markers, and/or the like. In FIG. 1G, about 25 fields are selected using the CD8 marker, and the FoxP3CD8 marker is used to predict immunotherapy responsiveness with a threshold degree of confidence. As shown in FIG. 1G, in this example, the maximum area under the curve is 0.74, as indicated by the oval in FIG. 1G, and is dependent on the number of fields selected.

In some implementations, the characterization platform may analyze distances between centroids of cells with particular markers, such as a distance between a centroid of a first cell marked with a first marker and a centroid of a second cell marked with a second marker. As indicated above, the first marker and the second marker may include any combination of CD163, FoxP3, CD163 PDL1neg, Tumor, Tumor PDL1+mid, FoxP3CD8PD1+low, FoxP3 PD1low+PDL1+, FoxP3CD8 PDL1+mid, Other cells PD1low+, PDL1+, FoxP3CD8+PD1+mid, CD 163 PDL1+, and/or other markers. In some implementations, the characterization platform may determine a distance or distances between centroids and may predict responsiveness to immunotherapy based on the distance or distances, such as by predicting immunotherapy responsiveness based on the distances being less than or equal to a threshold (e.g., 20 microns, 25 microns, 30 microns, and/or the like). For example, if the characterization platform determines that the first feature or marker and the second feature or marker are present or expressed and are within a threshold distance of one another, then the characterization platform can predict immunotherapy responsiveness with a threshold degree of confidence. Although two markers are provided as an example, a larger number of markers may be used in some implementations.

Thus, the fields may be selected based on ranking fields for which a feature or a combination of features satisfies a first condition (e.g., a condition relating to a level of expression or co-expression, a condition relating to spatial proximity or markers, a condition relating to another tissue feature, and/or the like). The selected fields may then be analyzed for responsiveness to immunotherapy based on whether a marker or a combination of markers satisfies a second condition. Although two conditions are provided as an example, a larger number of conditions may be used in some implementations. In this way, the characterization platform may perform an automated analysis on a tissue image to predict responsiveness to immunotherapy.

Providing an automated pipeline that is flexible and scalable, as described herein, permits the collection and processing of a larger amount of data (e.g., a greater quantity of field images, obtained in each of multiple optical bands) than possible with prior techniques, which increases analytical system throughput for possible clinical-decision making. In addition, automatically determining optimal thresholds of positivity for each individual specimen as well as automated field selection, as described herein, also increases such throughput. Utilizing machine learning techniques also streamlines the identification of cell components, such as cellular nuclei, membranes, cytoplasms, and/or the like. Automating the loading of a data structure (e.g., a parallel data structure) with image segmentation outputs and flux measurements, and providing spatial operation functions for statistically analyzing the loaded data, reduces or eliminates a need to rely on unwieldy spreadsheets, increases the accuracy and reproducibility of a fully-automated cell classification system, and facilitates characterizations of interactions at the single-cell level (e.g., including spatially-resolved measures of subcellular components, such as protein, mRNA, or cytokine expression). This provides faster and improved insight into normal tissue function, inflammatory and neoplastic disorders, and potential diagnosis, prognosis, therapeutic interventions.

As indicated above, FIGS. 1A-1G are provided merely as examples. Other examples are possible and may differ from what was described with regard to FIGS. 1A-1G. For example, although some implementations are described herein with respect to immuno-oncology applications, the implementations are equally, or similarly, applicable for use with prognostic features and therapeutic modalities across a broad array of malignant diseases. Additionally, or alternatively, although some implementations are described herein as using a particular number of features or markers (e.g., two features or markers) to select fields for further analysis and/or to predict responsiveness to immunotherapy, a larger number features or markers may be used in some implementations.

Figure 2:
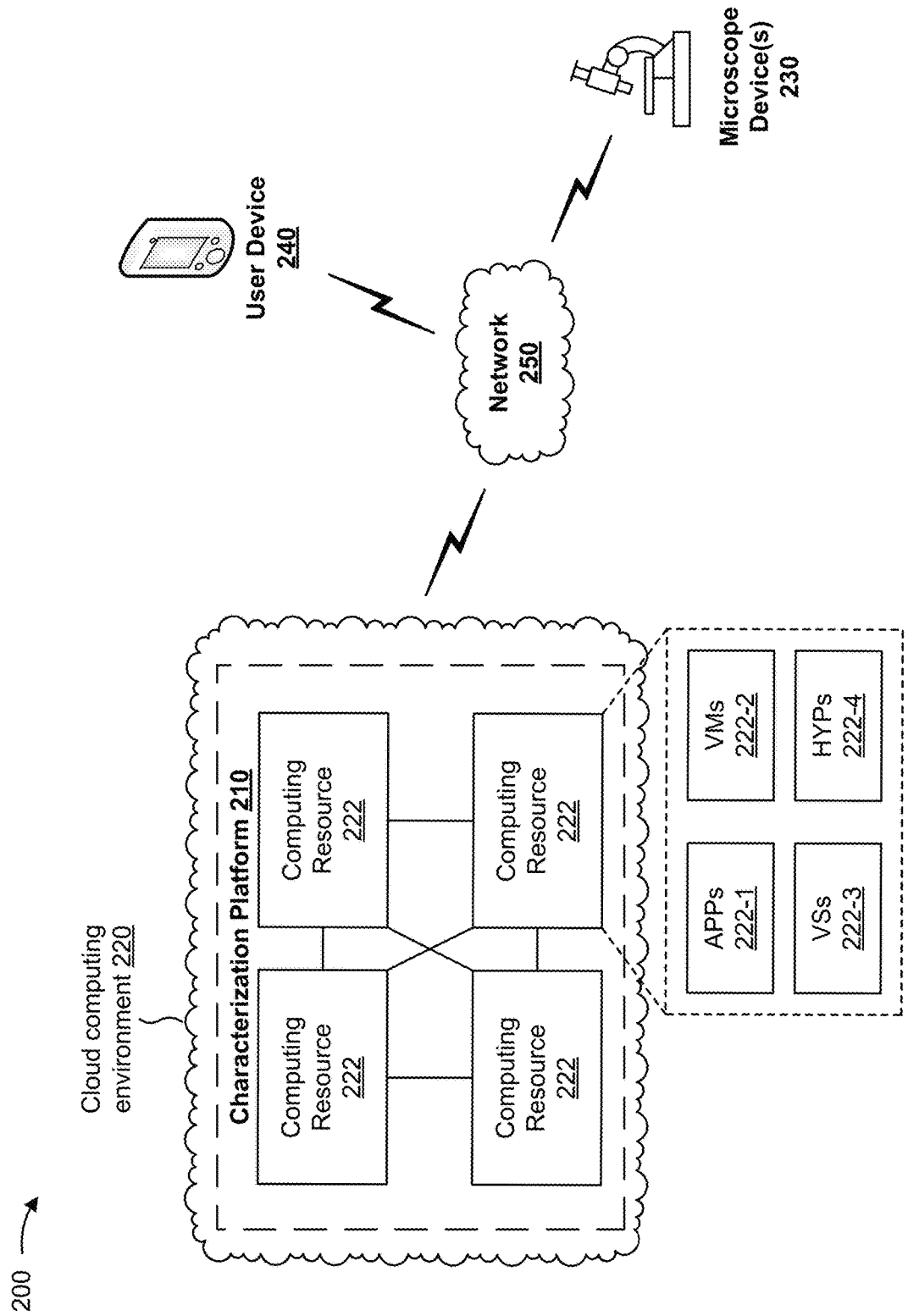
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a characterization platform 210, a cloud computing environment 220, microscope device(s) 230, a user device 240, and a network 250. Devices of environment 200 may interconnect via wired connections, wireless connections, or a combination of wired and wireless connections.

Characterization platform 210 includes one or more devices capable of receiving, generating, storing, processing, and/or providing information associated with a specimen (e.g., slices, or samples, of tissue). Characterization platform 210 may include a server device or a group of server devices. In some implementations, as shown, characterization platform 210 can be hosted in cloud computing environment 220. Notably, while implementations described herein describe characterization platform 210 as being hosted in cloud computing environment 220, in some implementations, characterization platform 210 is not cloud-based or can be partially cloud-based.

Cloud computing environment 220 includes an environment that delivers computing as a service, whereby shared resources, services, etc. can be provided to microscope device(s) 230, user device 240, and/or one or more other characterization platforms 210. Cloud computing environment 220 can provide computation, software, data access, storage, and/or other services that do not require end-user knowledge of a physical location and configuration of a system and/or a device that delivers the services. As shown, cloud computing environment 220 can include a set of computing resources 222.

Computing resource 222 includes one or more personal computers, workstation computers, server devices, or another type of computation and/or communication device. In some implementations, computing resource 222 can host characterization platform 210. The cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 can include a group of cloud resources, such as one or more applications ("APPs") 222-1, one or more virtual machines ("VMs") 222-2, virtualized storage ("VSs") 222-3, one or more hypervisors ("HYPs") 2224, and/or the like.

Application 222-1 includes one or more software applications that can be provided to or accessed by microscope device(s) 230 and/or user device 240. Application 222-1 can eliminate a need to install and execute the software applications on microscope device(s) 230 and/or user device 240. For example, application 222-1 can include software associated with characterization platform 210 and/or any other software capable of being provided via cloud computing environment 220. In some implementations, one application 222-1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system (OS). A process virtual machine can execute a single program, and can support a single process. In some implementations, virtual machine 222-2 can execute on behalf of microscope device(s) 230, a user (e.g., user device 240), and/or one or more other characterization platforms 210, and can manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

Microscope device(s) 230 include one or more devices capable of capturing images of specimens on a microscope slide. For example, a microscope device 230 may include, or have access to, an image sensor (e.g., a color camera) configured to capture field images (e.g., high power fields) of specimens. In some implementations, a microscope device 230 may include multiple lenses, a processor device, and one or more motors configured to control movement of the lenses for focusing on different areas of a specimen and to control operation of the image sensor for deep imaging of the different areas. In some implementations, a microscope device 230 may include a microspectral microscope that enables capturing of field images using one or more of multiple optical bands. In some implementations, field images, captured by a microscope device 230, may be provided to a characterization platform, such as characterization platform 210, for processing, as described elsewhere herein.

User device 240 includes one or more devices capable of receiving, generating, storing, processing, and/or providing information associated characterization platform 210. For example, user device 240 may include a communication and/or computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. In some implementations, user device 240 may receive statistical analysis data and/or results from characterization platform 210, and present such data and/or results for display.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
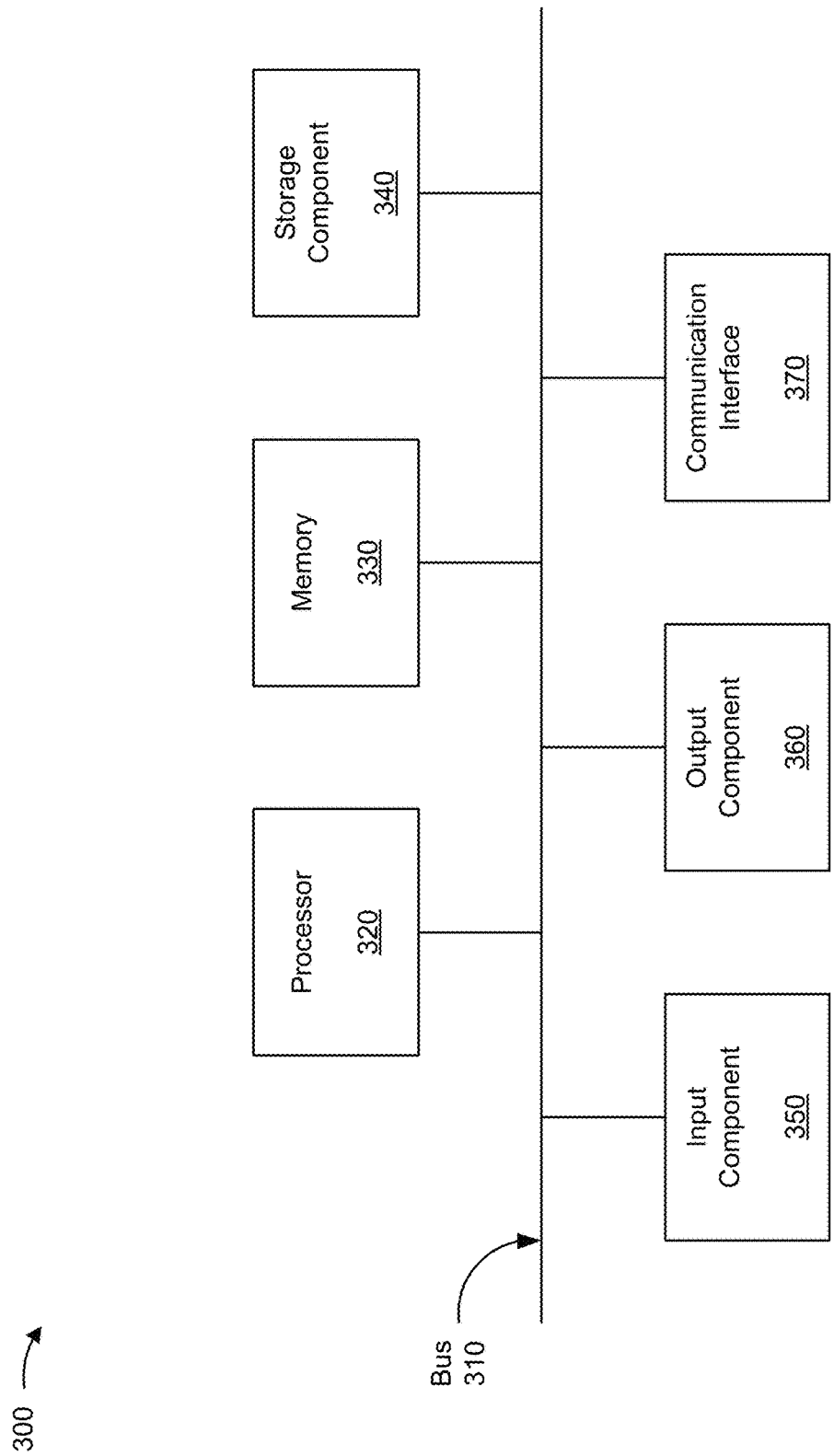
FIG. 3 is a diagram of example components of one or more devices of FIG. 2.

FIG. 3 is a diagram of example components of a device 300. Device 300 may correspond to characterization platform 210, microscope devices 230, and/or user device 240. In some implementations, characterization platform 210, microscope devices 230, and/or user device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, an actuator, and/or image sensor(s) (e.g., camera(s))). Output component 360 includes a component that provides output information from device 300 (e.g., a display, a speaker, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
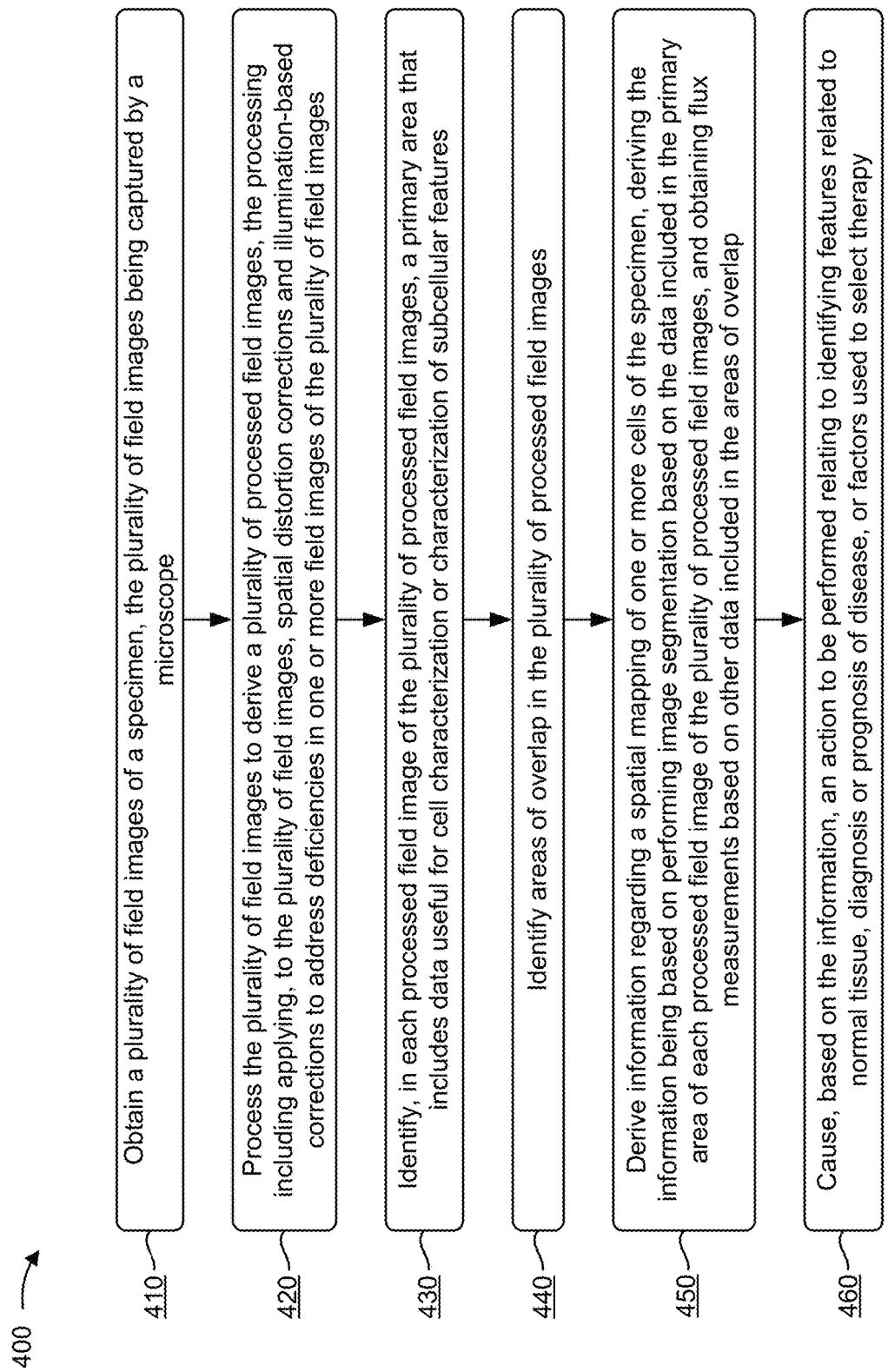
FIG. 4 is a flow chart of an example process for characterizing cells or subcellular components of a specimen for statistical analysis.

FIG. 4 is a flow chart of an example process 400 for characterizing cells or subcellular components of a specimen for statistical analysis. In some implementations, one or more process blocks of FIG. 4 may be performed by a characterization platform (e.g., characterization platform 210). In some implementations, one or more process blocks of FIG. 4 may be performed by another device or a group of devices separate from or including the characterization platform, such as microscope device(s) 230 and/or user device 240.

As shown in FIG. 4, process 400 may include obtaining a plurality of field images of a specimen, the plurality of field images being captured by a microscope (block 410). For example, the characterization platform (e.g., using computing resource 222, processor 320, memory 330, storage component 340, input component 350, communication interface 370, and/or the like) may obtain a plurality of field images of a specimen, as described above in connection with FIGS. 1A-1G. In some implementations, the plurality of field images may be captured by a microscope (e.g., a microscope device 230).

As further shown in FIG. 4, process 400 may include processing the plurality of field images to derive a plurality of processed field images, the processing including applying, to the plurality of field images, spatial distortion corrections and illumination-based corrections to address deficiencies in one or more field images of the plurality of field images (block 420). For example, the characterization platform (e.g., using computing resource 222, processor 320, memory 330, storage component 340, and/or the like) may process the plurality of field images to derive a plurality of processed field images, as described above in connection with FIGS. 1A-1G. In some implementations, the processing may include applying, to the plurality of field images, spatial distortion corrections and illumination-based corrections to address deficiencies in one or more field images of the plurality of field images.

As further shown in FIG. 4, process 400 may include identifying, in each processed field image of the plurality of processed field images, a primary area that includes data useful for cell characterization or characterization of subcellular features (block 430). For example, the characterization platform (e.g., using computing resource 222, processor 320, memory 330, storage component 340, and/or the like) may identify, in each processed field image of the plurality of processed field images, a primary area that includes data useful for cell characterization or characterization of subcellular features, as described above in connection with FIGS. 1A-1G.

As further shown in FIG. 4, process 400 may include identifying areas of overlap in the plurality of processed field images (block 440). For example, the characterization platform (e.g., using computing resource 222, processor 320, memory 330, storage component 340, and/or the like) may identify areas of overlap in the plurality of processed field images, as described above in connection with FIGS. 1A-1G.

As further shown in FIG. 4, process 400 may include deriving information regarding a spatial mapping of one or more cells of the specimen, deriving the information being based on performing image segmentation based on the data included in the primary area of each processed field image of the plurality of processed field images, and obtaining flux measurements based on other data included in the areas of overlap (block 450). For example, the characterization platform (e.g., using computing resource 222, processor 320, memory 330, storage component 340, and/or the like) may derive information regarding a spatial mapping of one or more cells of the specimen, as described above in connection with FIGS. 1A-1G. In some implementations, deriving the information may be based on performing image segmentation based on the data included in the primary area of each processed field image of the plurality of processed field images, and obtaining flux measurements based on other data included in the areas of overlap.

As further shown in FIG. 4, process 400 may include causing, based on the information, an action to be performed relating to identifying features related to normal tissue, diagnosis or prognosis of disease, or factors used to select therapy (block 460). For example, the characterization platform (e.g., using computing resource 222, processor 320, memory 330, storage component 340, output component 360, communication interface 370, and/or the like) may cause, based on the information, an action to be performed relating to identifying features related to normal tissue, diagnosis or prognosis of disease, or factors used to select therapy, as described above in connection with FIGS. 1A-1G.

Process 400 may include additional implementations, such as any single implementation or any combination of implementations described below and/or in connection with one or more other processes described elsewhere herein.

In some implementations, causing the action to be performed may include causing the information to be stored in a data structure to enable statistical analysis of the spatial mapping. In some implementations, causing the action to be performed may further include presenting, for display, a user interface that enables visualization of the information in conjunction with the plurality of field images and/or the plurality of processed field images. In some implementations, the user interface may include one or more user-selectable options for performing the statistical analysis.

In some implementations, process 400 may further include deriving a mosaic based on the plurality of processed field images, analyzing the mosaic to obtain additional information associated with the spatial mapping, and causing the additional information to be stored in the data structure for facilitating the statistical analysis.

In some implementations, applying the spatial distortion corrections may be based on a uniform correction model for unwarping images. In some implementations, applying the spatial distortion corrections may include cross-correlating the areas of overlap.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for characterizing cells or subcellular components of a specimen for statistical analysis. In some implementations, one or more process blocks of FIG. 5 may be performed by a characterization platform (e.g., characterization platform 210). In some implementations, one or more process blocks of FIG. 5 may be performed by another device or a group of devices separate from or including the characterization platform, such as microscope device(s) 230 and/or user device 240. In some implementations, a device (e.g., the characterization platform) may include one or more memories and one or more processors, communicatively coupled to the one or more memories, configured to perform process 500.

As shown in FIG. 5, process 500 may include obtaining a plurality of field images of a tissue sample, the plurality of field images being captured by a microscope (block 510). For example, the characterization platform (e.g., using computing resource 222, processor 320, memory 330, storage component 340, input component 350, communication interface 370, and/or the like) may obtain a plurality of field images of a tissue sample, as described above in connection with FIGS. 1A-1G. In some implementations, the plurality of field images may be captured by a microscope (e.g., a microscope device 230).

As further shown in FIG. 5, process 500 may include applying, to the plurality of field images, spatial distortion corrections and illumination-based corrections to derive a plurality of processed field images (block 520). For example, the characterization platform (e.g., using computing resource 222, processor 320, memory 330, storage component 340, and/or the like) may apply, to the plurality of field images, spatial distortion corrections and illumination-based corrections to derive a plurality of processed field images, as described above in connection with FIGS. 1A-1G.

As further shown in FIG. 5, process 500 may include identifying, in each processed field image of the plurality of processed field images, a primary area that includes data useful for cell characterization (block 530). For example, the characterization platform (e.g., using computing resource 222, processor 320, memory 330, storage component 340, and/or the like) may identify, in each processed field image of the plurality of processed field images, a primary area that includes data useful for cell characterization, as described above in connection with FIGS. 1A-1G.

As further shown in FIG. 5, process 500 may include identifying, in the plurality of processed field images, areas that overlap with one another (block 540). For example, the characterization platform (e.g., using computing resource 222, processor 320, memory 330, storage component 340, and/or the like) may identify, in the plurality of processed field images, areas that overlap with one another, as described above in connection with FIGS. 1A-1G.

As further shown in FIG. 5, process 500 may include deriving information regarding a spatial mapping of one or more cells of the tissue sample, wherein the one or more processors, when deriving the information, are configured to perform segmentation, on a subcellular level, a cellular level, or a tissue level, based on the data included in the primary area of each processed field image of the plurality of processed field images, and obtain flux measurements based on other data included in the areas that overlap with one another (block 550). For example, the characterization platform (e.g., using computing resource 222, processor 320, memory 330, storage component 340, and/or the like) may derive information regarding a spatial mapping of one or more cells of the tissue sample, as described above in connection with FIGS. 1A-1G. In some implementations, the one or more processors, when deriving the information, may be configured to perform segmentation, on a subcellular level, a cellular level, or a tissue level, based on the data included in the primary area of each processed field image of the plurality of processed field images, and obtain flux measurements based on other data included in the areas that overlap with one another.

As further shown in FIG. 5, process 500 may include causing the information to be loaded in a data structure to enable statistical analysis of the spatial mapping for identifying predictive factors for immunotherapy (block 560). For example, the characterization platform (e.g., using computing resource 222, processor 320, memory 330, storage component 340, output component 360, communication interface 370, and/or the like) may cause the information to be loaded in a data structure to enable statistical analysis of the spatial mapping for identifying predictive factors for immunotherapy, as described above in connection with FIGS. 1A-1G.

Process 500 may include additional implementations, such as any single implementation or any combination of implementations described below and/or in connection with one or more other processes described elsewhere herein.

In some implementations, the one or more processors, when causing the information to be loaded in the data structure, may cause the one or more processors to cause the information to be loaded in the data structure to enable statistical analysis, via one or more spatial operation functions integrated with the data structure, of the spatial mapping.

In some implementations, the one or more spatial operation functions may relate to at least one of spatial searches, operations on spatial polygons, or aggregations subject to one or more of cell phenotypes, subcellular phenotypes, expression levels, or spatial relations. In some implementations, the one or more spatial operation functions may be capable of representing spatial polygons relating to at least one of a boundary of the tissue sample, architectural features within the tissue sample, morphological features of the one or more cells, or shapes of morphological components of the one or more cells. In some implementations, the one or more spatial operation functions may relate to calculating at least one of intercellular distance, spatial distances between the one or more cells and a boundary of the tissue sample, spatial distances between subcellular components, or spatial distances between one or more of the subcellular components and the boundary of the tissue sample.

In some implementations, the information may identify pixels, in the plurality of processed field images, corresponding to outlines of the one or more cells, or center points or subcellular components of the one or more cells. In some implementations, the information may include data regarding classification types of the one or more cells. In some implementations, the one or more processors, when identifying the primary area in a processed field image of the plurality of processed field images, may identify a set of pixels, in the processed field image, that is proximate to a center point of the processed field image.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for characterizing cells or subcellular components of a specimen for statistical analysis. In some implementations, one or more process blocks of FIG. 6 may be performed by a characterization platform (e.g., characterization platform 210). In some implementations, one or more process blocks of FIG. 6 may be performed by another device or a group of devices separate from or including the characterization platform, such as microscope device(s) 230 and/or user device 240. In some implementations, a non-transitory computer-readable medium may store instructions. In some implementations, the instructions may include one or more instructions that, when executed by one or more processors (e.g., of the characterization platform), cause the one or more processors to perform process 600.

As shown in FIG. 6, process 600 may include obtaining a plurality of field images of a tissue sample (block 610). For example, the characterization platform (e.g., using computing resource 222, processor 320, memory 330, storage component 340, input component 350, communication interface 370, and/or the like) may obtain a plurality of field images of a tissue sample, as described above in connection with FIGS. 1A-1G.

As further shown in FIG. 6, process 600 may include applying, to the plurality of field images, spatial distortion corrections and/or illumination-based corrections to derive a plurality of processed field images (block 620). For example, the characterization platform (e.g., using computing resource 222, processor 320, memory 330, storage component 340, and/or the like) may apply, to the plurality of field images, spatial distortion corrections and/or illumination-based corrections to derive a plurality of processed field images, as described above in connection with FIGS. 1A-1G.

As further shown in FIG. 6, process 600 may include identifying, in each processed field image of the plurality of processed field images, a primary area that includes data useful for cell characterization (block 630). For example, the characterization platform (e.g., using computing resource 222, processor 320, memory 330, storage component 340, and/or the like) may identify, in each processed field image of the plurality of processed field images, a primary area that includes data useful for cell characterization, as described above in connection with FIGS. 1A-1G.

As further shown in FIG. 6, process 600 may include identifying, in the plurality of processed field images, areas that overlap with one another (block 640). For example, the characterization platform (e.g., using computing resource 222, processor 320, memory 330, storage component 340, and/or the like) may identify, in the plurality of processed field images, areas that overlap with one another, as described above in connection with FIGS. 1A-1G.

As further shown in FIG. 6, process 600 may include deriving spatial resolution information concerning one or more cells or subcellular components of the tissue sample, wherein the one or more instructions, that cause the one or more processors to derive the spatial resolution information, cause the one or more processors to perform image segmentation based on the data included in the primary area of each processed field image of the plurality of processed field images, and obtain flux measurements based on other data included in the areas that overlap with one another (block 650). For example, the characterization platform (e.g., using computing resource 222, processor 320, memory 330, storage component 340, and/or the like) may derive spatial resolution information concerning one or more cells or subcellular components of the tissue sample, as described above in connection with FIGS. 1A-1G. In some implementations, the one or more instructions, that cause the one or more processors to derive the spatial resolution information, cause the one or more processors to perform image segmentation based on the data included in the primary area of each processed field image of the plurality of processed field images, and obtain flux measurements based on other data included in the areas that overlap with one another.

As further shown in FIG. 6, process 600 may include causing a data structure to be populated with the spatial resolution information to enable statistical analyses useful for identifying predictive factors, prognostic factors, or diagnostic factors for one or more diseases or associated therapies (block 660). For example, the characterization platform (e.g., using computing resource 222, processor 320, memory 330, storage component 340, output component 360, communication interface 370, and/or the like) may cause a data structure to be populated with the spatial resolution information to enable statistical analyses useful for identifying predictive factors, prognostic factors, or diagnostic factors for one or more diseases or associated therapies, as described above in connection with FIGS. 1A-1G.

Process 600 may include additional implementations, such as any single implementation or any combination of implementations described below and/or in connection with one or more other processes described elsewhere herein.

In some implementations, the plurality of field images may include multiple sets of field images captured in different optical bands. In some implementations, the multiple sets of field images may be captured in at least thirty-five optical bands.

In some implementations, the one or more instructions, when executed by the one or more processors, may further cause the one or more processors to determine optimal thresholds of positivity for the tissue sample based on the flux measurements, and use the optimal thresholds of positivity to derive the spatial resolution information.

In some implementations, the one or more cells may include tumor cells and immune cells. In some implementations, the plurality of field images may be captured using a multispectral microscope (e.g., a microscope device 230).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Providing an automated pipeline that is flexible and scalable, as described herein, permits the collection and processing of a larger amount of data (e.g., a greater quantity of field images, obtained in each of multiple optical bands) than possible with prior techniques, which increases analytical system throughput for potential clinical use. In addition, automatically determining optimal thresholds of positivity for each individual specimen and automated field selection, as described herein, also increases such throughput. Utilizing machine learning techniques also streamlines the identification of cell components, such as cellular nuclei, membranes, cytoplasms, and/or the like. Automating the loading of a data structure (e.g., a parallel data structure) with image segmentation outputs and flux measurements, and providing spatial operation functions for statistically analyzing the loaded data, reduces or eliminates a need to rely on unwieldy spreadsheets, increases the accuracy and reproducibility of a fully-automated cell classification system, and facilitates characterizations of interactions at the single-cell level (e.g., including spatially-resolved measures of protein expression). This provides faster and improved insight into normal tissue function, disease pathogenesis, inflammatory disease and tumor development, and candidate therapeutic targets.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
   obtaining, by a device, a plurality of images of a specimen;
   applying, by the device and to the plurality of images, a spatial distortion correction and an illumination-based correction to derive a plurality of processed images;
   identifying, by the device and in a processed image of the plurality of processed images, a primary area that includes data useful for cell characterization or characterization of subcellular features;
   identifying, by the device, areas of overlap in the plurality of processed field images;
   deriving, by the device, information regarding a spatial mapping of one or more cells of the specimen,
      deriving the information being based on obtaining flux measurements based on other data included in the areas of overlap; and
   causing, by the device and based on the information, an action to be performed relating to identifying features related to normal tissue, diagnosis or prognosis of disease, or factors associated with a therapy.

2. The method of claim 1, wherein the spatial distortion correction comprises:
   associating mismatches between the plurality of images with a virtual spring variable that identifies how much the virtual string is extended; and
   determining an appropriate position for the plurality of images based on the virtual spring variable.

3. The method of claim 1, wherein the spatial distortion correction comprises:
   determining updated centers of the plurality of images; and
   minimizing relative shifts of the plurality of images based on using a model of virtual springs,
      wherein an overlap in the plurality of images corresponds to a virtual string that is stretched by an amount corresponding to a relative shift between the plurality of images.

4. The method of claim 1, wherein the plurality of images are captured by a multispectral device.

5. The method of claim 1, wherein the spatial distortion correction and the illumination-based correction are to address deficiencies in one or more images of the plurality of images.

6. The method of claim 1, wherein deriving the information is further based on performing image segmentation based on the data included in the primary area of the plurality of processed field images.

7. The method of claim 1, wherein the action comprises: causing the information to be stored in a data structure to enable statistical analysis of the spatial mapping for identifying predictive factors for immunotherapy.

8. A device, comprising:
   one or more memories; and
   one or more processors, coupled to the one or more memories, configured to:
      obtain a plurality of images of a specimen;
         apply, to the plurality of images, a spatial distortion correction and an illumination-based correction to derive a plurality of processed images;
      identify, in a processed image of the plurality of processed images, a primary area that includes data useful for cell characterization or characterization of subcellular features;
      identify areas of overlap in the plurality of processed field images;
      derive information regarding a spatial mapping of one or more cells of the specimen,
         derive the information being based on obtaining flux measurements based on other data included in the areas of overlap; and
      cause, based on the information, an action to be performed relating to identifying features related to normal tissue, diagnosis or prognosis of disease, or factors associated with a therapy.

9. The device of claim 8, wherein the spatial distortion correction comprises:
   associate mismatches between the plurality of images with a virtual spring variable that identifies how much the virtual string is extended; and
   determine an appropriate position for the plurality of images based on the virtual spring variable.

10. The device of claim 8, wherein the spatial distortion correction comprises:
    determine updated centers of the plurality of images; and
    minimize relative shifts of the plurality of images based on using a model of virtual springs, wherein an overlap in the plurality of images corresponds to a virtual string that is stretched by an amount corresponding to a relative shift between the plurality of images.

11. The device of claim 8, wherein the plurality of images are captured by a multispectral device.

12. The device of claim 8, wherein the spatial distortion correction and the illumination-based correction are to address deficiencies in one or more images of the plurality of images.

13. The device of claim 8, wherein deriving the information is further based on performing image segmentation based on the data included in the primary area of the plurality of processed field images.

14. The device of claim 8, wherein the action comprises:
cause the information to be stored in a data structure to enable statistical analysis of the spatial mapping for identifying predictive factors for immunotherapy.

15. A non-transitory computer-readable medium storing a set of instructions, the set of instructions comprising:
one or more instructions that, when executed by one or more processors of a device, cause the device to:
obtain a plurality of images of a specimen;
apply, to the plurality of images, a spatial distortion correction and an illumination-based correction to derive a plurality of processed images;
identify, in a processed image of the plurality of processed images, a primary area that includes data useful for cell characterization or characterization of subcellular features;
identify areas of overlap in the plurality of processed field images;
derive information regarding a spatial mapping of one or more cells of the specimen,
derive the information being based on obtaining flux measurements based on other data included in the areas of overlap; and
cause, based on the information, an action to be performed relating to identifying features related to normal tissue, diagnosis or prognosis of disease, or factors associated with a therapy.

16. The non-transitory computer-readable medium of claim 15, wherein the one or more instructions further cause the device to:
associate mismatches between the plurality of images with a virtual spring variable that identifies how much the virtual string is extended; and
determine an appropriate position for the plurality of images based on the virtual spring variable.

17. The non-transitory computer-readable medium of claim 15, wherein the one or more instructions further cause the device to:
determine updated centers of the plurality of images; and
minimize relative shifts of the plurality of images based on using a model of virtual springs,
wherein an overlap in the plurality of images corresponds to a virtual string that is stretched by an amount corresponding to a relative shift between the plurality of images.

18. The non-transitory computer-readable medium of claim 15, wherein the one or more instructions further cause the device to address deficiencies in one or more images of the plurality of images.

19. The non-transitory computer-readable medium of claim 15, wherein deriving the information is further based on performing image segmentation based on the data included in the primary area of the plurality of processed field images.

20. The non-transitory computer-readable medium of claim 15, wherein the one or more instructions further cause the device to:
cause the information to be stored in a data structure to enable statistical analysis of the spatial mapping for identifying predictive factors for immunotherapy.

* * * * *